United States Patent
Ue et al.

(10) Patent No.: US 9,345,030 B2
(45) Date of Patent: May 17, 2016

(54) WHITE SPACE SHARING BASED ON PRIORITY OF COMPETING APPLICATIONS

(75) Inventors: Toyoki Ue, Kanagawa (JP); Kenichi Nakamura, Tokyo (JP); Seigo Nakao, Kanagawa (JP); Ryohei Kimura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 47 days.

(21) Appl. No.: 14/236,924

(22) PCT Filed: Aug. 3, 2012

(86) PCT No.: PCT/JP2012/004937
§ 371 (c)(1),
(2), (4) Date: Feb. 4, 2014

(87) PCT Pub. No.: WO2013/021596
PCT Pub. Date: Feb. 14, 2013

(65) Prior Publication Data
US 2014/0213313 A1 Jul. 31, 2014

(30) Foreign Application Priority Data
Aug. 11, 2011 (JP) ................................. 2011-176142

(51) Int. Cl.
*H04W 72/04* (2009.01)
*H04W 16/14* (2009.01)

(52) U.S. Cl.
CPC .......... *H04W 72/0453* (2013.01); *H04W 16/14* (2013.01); *H04W 72/048* (2013.01)

(58) Field of Classification Search
None
See application file for complete search history.

(56) References Cited

U.S. PATENT DOCUMENTS

| 7,778,224 B2 | 8/2010 | Hayashi et al. ............... 370/335 |
| 8,483,134 B2 | 7/2013 | Iwai et al. .................... 370/328 |

(Continued)

FOREIGN PATENT DOCUMENTS

| JP | 2007-300419 | 11/2007 |
| JP | 2009-177816 | 8/2009 |

OTHER PUBLICATIONS

Kazuhisa Okamoto et al., "Frequency Sharing Method using Frequency Priority Table for Reducing Interference among Secondary Systems with English Abstract", IEICE Technical Report, vol. 111 No. 13, Apr. 14, 2011, pp. 45-51.

(Continued)

*Primary Examiner* — Philip Sobutka
(74) *Attorney, Agent, or Firm* — Greenblum & Bernstein, P.L.C.

(57) ABSTRACT

Provided are white space sharing control method, database device, agent device and communication system with which use of white space (WS) is controlled when a plurality of WS wireless devices compete for use of WS. In ST105, an application A proxy device arbitrates WS channel use requests received from a plurality of application A first WS wireless devices and combines these requests into one, and, in ST107, the application A proxy device transmits the arbitrated WS channel use request and location information to a frequency database apparatus. In ST108, the frequency database apparatus decides whether or not application A and application B are available on the basis of the "arbitrated WS channel use request and location information" and "priority ranking information according to use". In ST109, the frequency database apparatus updates application A database information and application B database information on the basis of the decision result.

10 Claims, 26 Drawing Sheets

(56) References Cited

U.S. PATENT DOCUMENTS

| | | | |
|---|---|---|---|
| 2007/0253394 A1 | 11/2007 | Horiguchi et al. | 370/338 |
| 2008/0130519 A1* | 6/2008 | Bahl et al. | 370/254 |
| 2009/0191906 A1 | 7/2009 | Abedi | 455/501 |
| 2011/0080882 A1* | 4/2011 | Shu et al. | 370/329 |
| 2011/0194503 A1* | 8/2011 | Stanforth | 370/329 |
| 2011/0307612 A1* | 12/2011 | Junell | H04W 16/14 709/226 |
| 2013/0117402 A1* | 5/2013 | Jo et al. | 709/208 |

OTHER PUBLICATIONS

Federal Communications Commission, "Second Memorandum Opinion and Order", FCC 10-174, Sep. 23, 2010.

International Search Report in PCT/JP2012/004937, mailed on Sep. 4, 2012.

* cited by examiner

|       | PRIMARY | APPLICATION A | APPLICATION B |
|-------|---------|---------------|---------------|
| Ch.#1 | USED    | UNAVAILABLE   | UNAVAILABLE   |
| Ch.#2 | –       | AVAILABLE     | AVAILABLE     |
| Ch.#3 | –       | AVAILABLE     | AVAILABLE     |
| Ch.#4 | –       | AVAILABLE     | AVAILABLE     |

FIG. 2A

|       | PRIMARY | APPLICATION A | APPLICATION B |
|-------|---------|---------------|---------------|
| Ch.#1 | USED    | UNAVAILABLE   | UNAVAILABLE   |
| Ch.#2 | –       | UNAVAILABLE   | AVAILABLE     |
| Ch.#3 | –       | UNAVAILABLE   | AVAILABLE     |
| Ch.#4 | –       | UNAVAILABLE   | AVAILABLE     |

FIG. 2B

|  | PRIMARY | APPLICATION A | APPLICATION B |
|---|---|---|---|
| Ch.#1 | USED | UNAVAILABLE | UNAVAILABLE |
| Ch.#2 | - | - | AVAILABLE |
| Ch.#3 | - | - | AVAILABLE |
| Ch.#4 | - | - | AVAILABLE |

FIG. 4A

|  | PRIMARY | APPLICATION A | APPLICATION B |
|---|---|---|---|
| Ch.#1 | USED | UNAVAILABLE | UNAVAILABLE |
| Ch.#2 | - | AVAILABLE | AVAILABLE |
| Ch.#3 | - | AVAILABLE | AVAILABLE |
| Ch.#4 | - | - | AVAILABLE |

FIG. 4B

| Ch.#2 | APPLICATION A | APPLICATION B |
|---|---|---|
| AREA #1 | – | AVAILABLE |
| AREA #2 | – | AVAILABLE |
| AREA #3 | – | AVAILABLE |
| AREA #4 | – | AVAILABLE |

AREA MAP

USE REQUEST FOR APPLICATION A ARISE IN AREA #1

| Ch.#2 | APPLICATION A | APPLICATION B |
|---|---|---|
| AREA #1 | AVAILABLE | UNAVAILABLE |
| AREA #2 | AVAILABLE | UNAVAILABLE |
| AREA #3 | AVAILABLE | UNAVAILABLE |
| AREA #4 | – | AVAILABLE |

| Ch.#2 | APPLICATION A | | APPLICATION B |
|---|---|---|---|
| | POWER CLASS | OPTION | POWER CLASS |
| AREA #1 | - | - | PC1 |
| AREA #2 | - | - | PC1 |
| AREA #3 | - | - | PC1 |
| AREA #4 | - | - | PC1 |
FIG. 19A
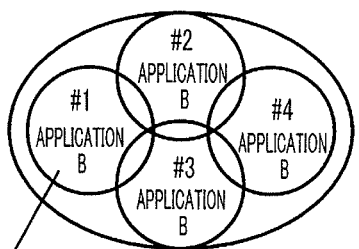
AREA MAP
USE REQUEST FOR APPLICATION A ARISE IN AREA #1
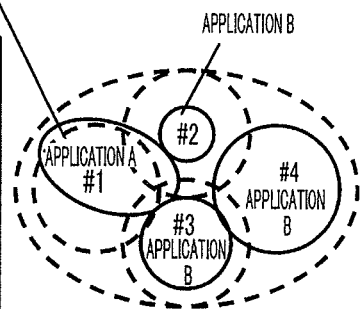
APPLICATION B
| Ch.#2 | APPLICATION A | | APPLICATION B |
|---|---|---|---|
| | POWER CLASS | OPTION | POWER CLASS |
| AREA #1 | PC1 | BF | UNAVAILABLE |
| AREA #2 | - | - | PC3 |
| AREA #3 | - | - | PC2 |
| AREA #4 | - | - | PC1 |
FIG. 19B

WHITE SPACE SHARING BASED ON PRIORITY OF COMPETING APPLICATIONS

TECHNICAL FIELD

The present invention relates to white space sharing control method for controlling the use of white space, a database apparatus, an agent apparatus, and a communication system.

BACKGROUND ART

White space (hereafter referred to as "WS") refers to a frequency domain in a specific frequency band allocated to a service using radio wave such as broadcast and communication but not being in use. As the demand for wireless communication increases in recent years, effective use of the WS has been considered. The usage of the WS includes broadband services for general public, local one-segment broadcasting, disaster prevention broadcasting, emergency broadcasting, tour guides, and so on, and the WS must be shared by these various usages.

Accordingly, it is necessary for a WS user (secondary user) to first find out an available channel (frequency) by referring to frequency database information owned by a frequency database apparatus so as to avoid interference on the primary system (primary user).

As a method for sharing a WS by WS users, the WS is used after confirming, by sensing or others, that the WS users nearby are not interfered. Alternatively, in order to avoid the interference more securely, the WS user himself registers that a WS is used on the frequency database, so that other WS users are excluded as another method. In the following description, the latter will be described with reference to FIG. 1 and FIG. 2.

FIG. 1 is a sequence diagram for describing a WS sharing control method. In FIG. 1, in step (hereafter abbreviated as "ST") 11, a frequency database apparatus regularly obtains information regarding a channel (channel #1: Ch. #1) used by the primary system (primary system information). In ST12, the frequency database apparatus updates frequency database information related to an available channel and an unavailable channel for the WS user.

In ST13, the second WS wireless device for application B (hereafter simply referred to as "second WS wireless device") refers to the frequency database information held by the frequency database apparatus. In ST14, the second WS wireless device obtains information on an available channel. In addition, in ST15, the second WS wireless device registers a channel to be used on the frequency database held by the frequency database apparatus. In this method, the available channels are channels #2 to 4 (Ch. #2 to 4), and the channels used by the second WS wireless device are also channels #2 to 4.

In ST16, the frequency database apparatus updates frequency database information based on the registration by the second WS wireless device.

In ST17, the first WS wireless device for application A (hereafter simply referred to as "first WS wireless device") refers to the frequency database information owned by the frequency database apparatus as a WS channel use request. In ST18, the first WS wireless device obtains the determination result that the channel is not available. As described above, it is possible to avoid the interference between WS users of different applications, that is, between the first WS wireless device for application A and the second WS wireless device for application B.

FIGS. 2A and 2B represent update statuses of frequency database information in the WS sharing control method illustrated in FIG. 1. FIG. 2A represents frequency database information before the update at ST16 in FIG. 1. More specifically, the frequency database information represents that the channel #1 (Ch. #1) is used by the primary system, and the channels #2 to 4 (Ch. #2 to 4) are available for WS for application A and for application B.

FIG. 2B represents frequency database information after the update at ST16 in FIG. 1. More specifically, the frequency database information represents that channel #1 (Ch. #1) is used by the primary system, and channels #2 to 4 (Ch. #2 to 4) are used by the second WS wireless device for application B. As a result, it is determined that the channels #1 to 4 (Ch. #1 to 4) are unavailable for application A.

CITATION LIST

Non-Patent Literature

NPL1
FCC 10-174, "SECOND MEMORANDUM OPINION AND ORDER" (Sep. 23, 2010)

SUMMARY OF INVENTION

Technical Problem

However, with the method described above, a WS user who started using the WS first or a WS user who registered on the frequency database apparatus can use the WS preferentially, and there is a problem that a WS user who requests the application afterward cannot use the WS even if the application is, for example, for disaster prevention or emergency.

It is an object of the present invention to provide white space sharing control method, a database apparatus, an agent apparatus and a communication system capable of controlling the usage of WS when there is competition for using a WS between WS wireless devices for different applications.

Solution to Problem

The white space sharing control method according to the present invention includes: determining, by a database apparatus or an agent apparatus, availability of white space for each application based on priority of applications of white space determined in advance, when a plurality of wireless devices for different applications compete for using the white space; and notifying, by the database apparatus or the agent apparatus, the wireless devices for the different applications of a result of the determination.

The database apparatus according to the present invention includes: an availability determining section that determines availability of white space for each application based on (i) a request for using the white space transmitted from a wireless device, (ii) primary system information representing a channel used by a primary system, and (iii) application-specific priority information representing priority determined for each application of the white space in advance; and a database information updating section that stores a result of the determination and updates database information storing a use status of the white space for each application.

The agent apparatus according to the present invention includes: an availability determining section that determines availability of white space for each application based on (i) a request for using the white space transmitted from a wireless device, (ii) primary system information representing a channel used by a primary system, and (iii) application-specific priority information representing priority determined for each application of the white space in advance; and a notifying section that notifies the wireless device of a result of the determination.

The communication system according to the present invention includes: a proxy apparatus that arbitrates requests for using white space transmitted from a plurality of wireless devices for a same application; and a database apparatus including: an availability determining section that determines availability of white space for each application based on (i) a request for using the white space arbitrated by the proxy apparatus, (ii) primary system information representing a channel used by a primary system, and (iii) application-specific priority information representing priority determined for each application of the white space in advance; and a database information updating section that stores a result of the determination and updates database information storing a use status of the white space for each application.

Advantageous Effects of Invention

According to the present invention, the use of WS can be controlled when there is competition in the use of WS between WS wireless devices for different uses.

BRIEF DESCRIPTION OF DRAWINGS

FIGS. 2A and 2B represent update statuses of frequency database information in WS sharing control method illustrated in FIG. 1;

FIGS. 4A and 4B represent update statuses of frequency database information in WS sharing control method illustrated in FIG. 3;

FIGS. 19A and 19B represent update statuses of frequency database information in the WS sharing control method illustrated in FIG. 18;

DESCRIPTION OF EMBODIMENTS

Figure 1:
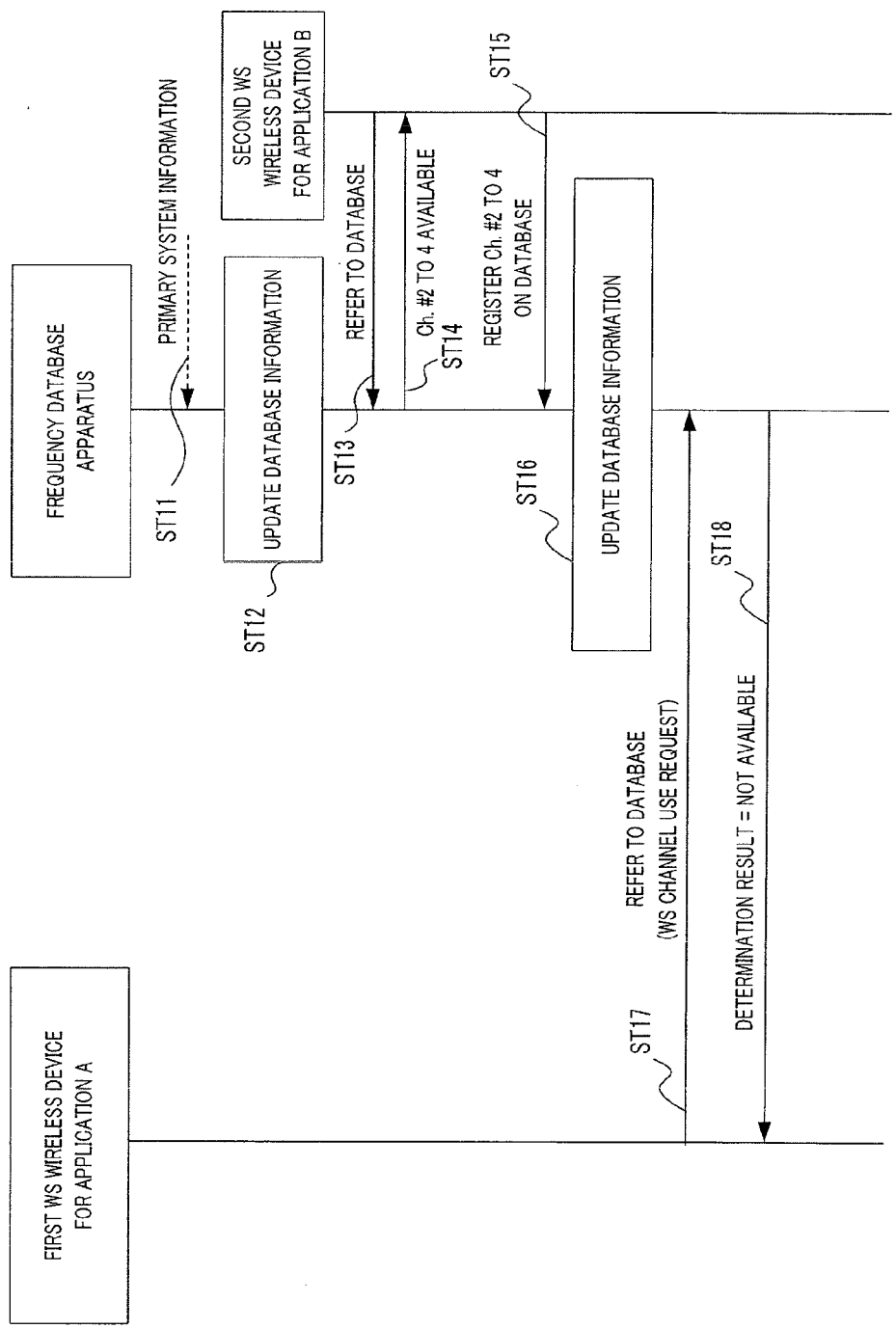
FIG. 1 is a sequence diagram for describing a WS sharing control method.

Embodiments of the present invention will be described in detail with reference to the drawings. However, note that the same reference numerals are assigned to the components having the same function, and overlapping description for the components are omitted in Embodiments.

Embodiment 1

Figure 3:
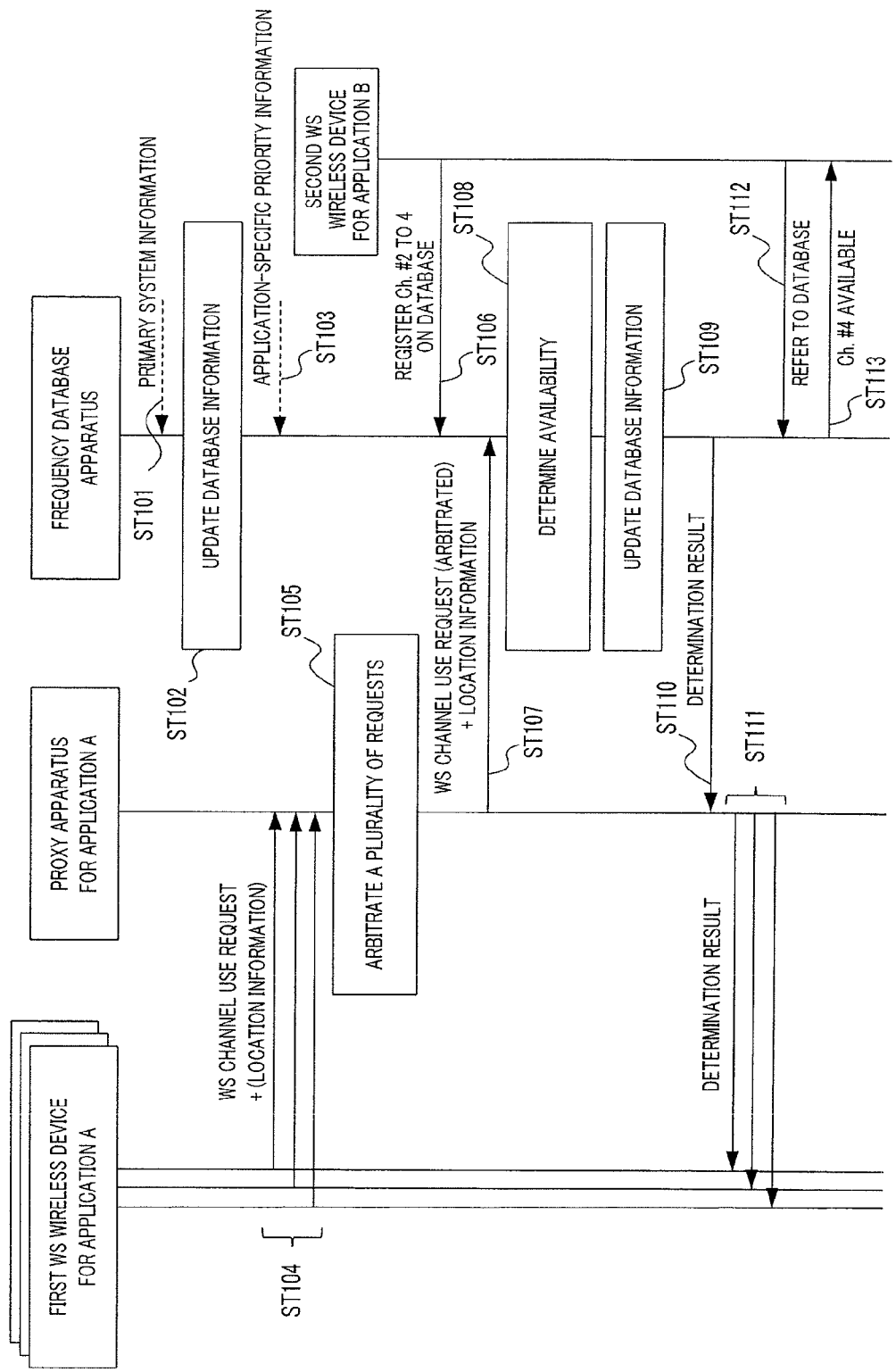
FIG. 3 is a sequence diagram for describing a WS sharing control method according to Embodiment 1 of the present invention.

FIG. 3 is a sequence diagram for describing a WS sharing control method according to Embodiment 1 of the present invention. As illustrated in FIG. 3, in ST101, a frequency database apparatus regularly obtains information regarding a channel used by a primary system (primary system information). In ST102, the frequency database apparatus updates frequency database information representing an available channel and an unavailable channel for each application. Note that, primary system information is created by a radio frequency management organization superior to the frequency database apparatus. The frequency database apparatus cannot change the content of the primary system information.

in ST103, the frequency database apparatus regularly obtains the application-specific priority information, and refers to the information when performing use-permission control between WS users. Note that, the application-specific priority information is created by a radio frequency management organization superior to the frequency database apparatus. The frequency database apparatus cannot change the content of the application-specific priority information. The application-specific priority information is usually created according to the degree of importance or a degree of urgency. For example, application for a disaster prevention wireless system by a municipal employee may be prioritized over the Internet access by a regular citizen.

In ST104, a plurality of first WS wireless devices for application A (hereafter simply referred to as "the first WS wireless devices") transmit a WS channel use request to a proxy apparatus for application A. Note that, the first WS wireless device may also transmit location information of the wireless device to the proxy apparatus as necessary. The location information is information obtained by the GPS (Global Positioning System) or another positioning technique.

In ST 105, the proxy apparatus for application A arbitrates WS channel use requests received from a plurality of first WS wireless devices, and combines the plurality of use requests into one request for application A. As a method for arbitration, for example, overlapping requests may be combined into one request or a more important request among requests for the same application (for example, giving priority to video from a disaster site over communication between employees) at the time of disaster.

In ST106, the second WS wireless device for application B (hereafter simply referred to as the "second WS wireless device") having priority lower than application A registers the use of channels #2 to 4 (Ch. #2 to 4) as WS channels.

In ST107, the proxy apparatus for application A transmits an arbitrated WS channel use request and the location information to the frequency database apparatus.

in ST108, the frequency database apparatus determines availability for application A and application B, based on "arbitrated WS channel use request and location information" and "application-specific priority information". Among WS channels being used for application B (channels #2 to 4), the frequency database apparatus determines the channels #2 and 3 as available for application A, and determines only the channel #4 as available for application B. As the determination method, (1) assuming that all of the requests for application A are accepted when the priority is application A>application B, the resource used for application B being reduced as necessary, or (2) setting a radio resource allocation ratio (for example, application A: application B=9:1) and performing determination to achieve the ratio (by generating random numbers, for example) may be possible.

In ST109, the frequency database apparatus updates database information for application A and database information for application B, based on the determination result. In ST110, the frequency database apparatus transmits the determination result for application A (availability information) to proxy apparatus for application A.

In ST111, the proxy apparatus for application A transmits the determination result received from the frequency database apparatus to a plurality of the first WS wireless devices.

In ST112, the second WS wireless device refers to database information owned by the frequency database apparatus. In ST113, the second WS wireless device obtains information that only the channel #4 (Ch. #4) is available for application B.

With the control, even when a use request for application A with higher priority is generated for a WS channel being in use for application B which has lower priority, the WS channel becomes available for application A.

FIGS. 4A and 4B represent update statuses of frequency database information in the WS sharing control method illustrated in FIG. 3. FIG. 4A represents frequency database information before the update at ST109 in FIG. 3. More specifically, the frequency database information represents that the channel #1 (Ch. #1) is used by the primary system, and the channels #2 to 4 (Ch. #2 to 4) are available for WS for application B.

FIG. 4B represents frequency database information after the update at ST109 in FIG. 3. More specifically, the frequency database information indicates that channel #1 (Ch. #1) is used by the primary system, and the channels #2, 3 (Ch. #2, 3) are available for the first WS wireless device for application A and the second WS for application B, and channel #4 (Ch. #4) is available for the second WS wireless device for application B.

Figure 5:
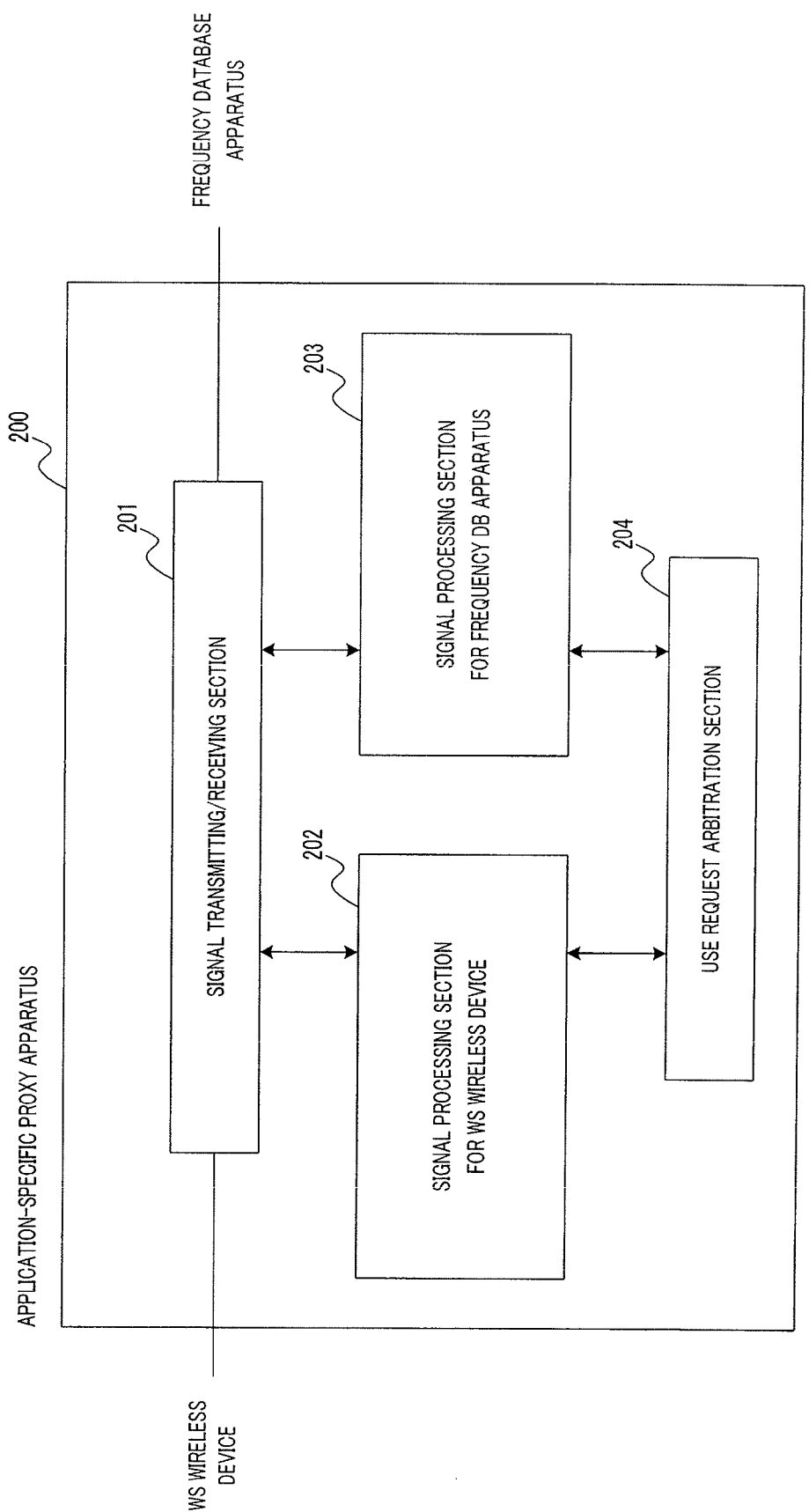
FIG. 5 is a block diagram illustrating a configuration of an application-specific proxy apparatus according to Embodiment 1 of the present invention.

FIG. 5 is a block diagram illustrating the configuration of application-specific proxy apparatus 200 according to Embodiment 1 of the present invention. In FIG. 5, signal transmitting/receiving section 201 transmits and receives signals between the WS wireless device and the frequency database apparatus. More specifically, signal transmitting/receiving section 201 outputs signals received from WS wireless device to signal processing section for WS wireless device 202, and outputs the signals received from the frequency database apparatus to signal processing section for frequency database (DB) apparatus 203. In addition, signal transmitting/receiving section 201 transmits transmission signals provided from signal processing section for WS wireless device 202 to a WS wireless device, and transmits a transmission signal provided from signal processing section for frequency database apparatus 203 to the frequency database apparatus.

Signal processing section for WS wireless device 202 performs processing according to the signal received from signal transmitting/receiving section 201 and generates a transmission signal for the WS wireless device. The generated transmission signal is provided to signal transmitting/receiving section 201. Furthermore, when the signals are WS channel use requests from a plurality of wireless devices are requests from a plurality of WS wireless device received from signal transmitting/receiving section 201, signal processing section for WS wireless device 202 outputs a WS channel use request to use request arbitration section 204.

Signal processing section for frequency database apparatus 203 performs processing according to the signal received from signal transmitting/receiving section 201 and generates a transmission signal for a frequency database apparatus. The generated transmission signals are output to signal transmitting/receiving section 201.

Use request arbitration section 204 combines a plurality of WS channel use request from a plurality of WS wireless devices output from signal processing section for WS wireless device 202 into one use request, and outputs the combined WS channel use request to signal processing section for frequency database apparatus 203.

Figure 6:
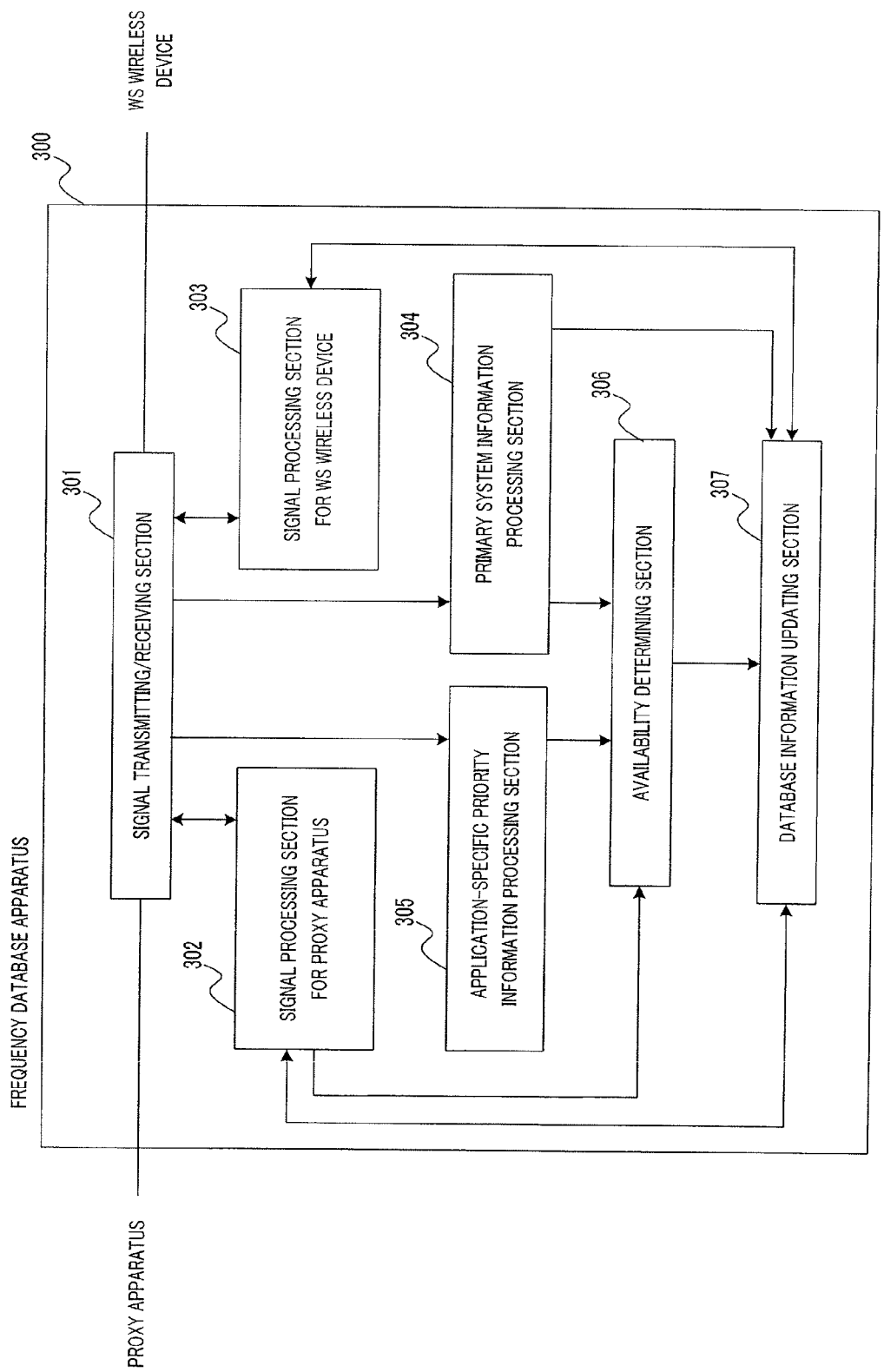
FIG. 6 is a block diagram illustrating a configuration of a frequency database apparatus according to Embodiment 1 of the present invention.

FIG. 6 is a block diagram illustrating the configuration of frequency database apparatus 300 according to Embodiment 1 of the present invention. In FIG. 6, signal transmitting/receiving section 301 transmits and receives signals with WS wireless device, an application-specific proxy apparatus, and a superior radio frequency management organization. Note that, the signal transmission/reception with the superior radio frequency management organization is performed through an application-specific proxy apparatus or another means (not illustrated). More specifically, signal transmitting/receiving section 301 outputs signal received from the application-specific proxy apparatus to signal processing section for proxy apparatus 302, and outputs the signaling received from the WS wireless device to signal processing section for WS wireless device 303. Signal transmitting/receiving section 301 outputs primary system information and application-specific priority information received from the superior radio frequency management organization to primary system information processing section 304 and application-specific priority information processing section 305, respectively. Signal transmitting/receiving section 301 transmits the transmission signal output from signal processing section for proxy apparatus 302 to the application-specific proxy apparatus, and the transmission signal output from signal processing section for WS wireless device 303 to the WS wireless device.

Signal processing section for proxy apparatus 302 performs processing according to the signal received from signal transmitting/receiving section 301, and generates a transmission signal for application-specific proxy apparatus based on database update information provided from database information updating section 307. The generated transmission signal is provided to signal transmitting/receiving section 301. When the signal received from signal transmitting/receiving section 301 is an arbitrated WS channel use request, signal processing section for proxy apparatus 302 outputs the arbitrated WS channel use request to availability determining section 306.

Signal processing section for WS wireless device 303 performs processing according to the signal received from signal transmitting/receiving section 301 and generates a transmission signal for the WS wireless device based on the database update information. The generated transmission signal is provided to signal transmitting/receiving section 301.

Primary system information processing section 304 performs a predetermined process on the primary system information from a superior radio frequency management organization output from signal transmitting/receiving section 301 (for example, a process for converting the data in a state that can be used in either availability determining section 306 or database information updating section 307), and outputs the converted information to availability determining section 306 and database information updating section 307.

Application-specific priority information processing section 305 performs a predetermined process on the application-specific priority information from the superior radio frequency management organization output from signal transmitting/receiving section 301 (for example, a process for converting the information usable on availability determining section 306), and outputs the information to availability determining section 306.

Availability determining section 306 determines availability for application A and application B, based on an arbitrated WS channel use request from an application-specific priority proxy apparatus output from signal processing section for proxy apparatus 302, primary system information output from primary system information processing section 304, and application-specific priority information output from application-specific priority information processing section 305. Availability determining section 306 outputs the determination result to database information updating section 307.

Database information updating section 307 registers, on the database, the channel being used by the primary system output from primary system information processing section 304. In addition, database information updating section 307 updates the database information for application A and the database information for application B, based on the determination result output from availability determining section 306. Furthermore, database information updating section 307 outputs database updating information in response to an inquiry from signal processing section for proxy apparatus 302 and signal processing section for WS wireless device 303.

As described above, according to Embodiment 1, priority is determined for each application in advance, and availability of WS channels is determined according to the priority for each application. With this, even when a use request for an application with higher priority arises for a WS channel being used for an application with lower priority, the WS channel can be made available for an application with higher priority, and thus the use of WS is controlled.

Note that, in Embodiment 1, the transmission/reception between the WS wireless device and a proxy apparatus for application A, between the WS wireless device and the frequency database apparatus, and between the proxy apparatus for application A and the frequency database may be either wireless or wired transmission. Furthermore, in the case of wireless transmission, the transmission/reception may be performed on a wireless system operated on the WS or a wireless system operated outside of WS.

Embodiment 2

Figure 7:
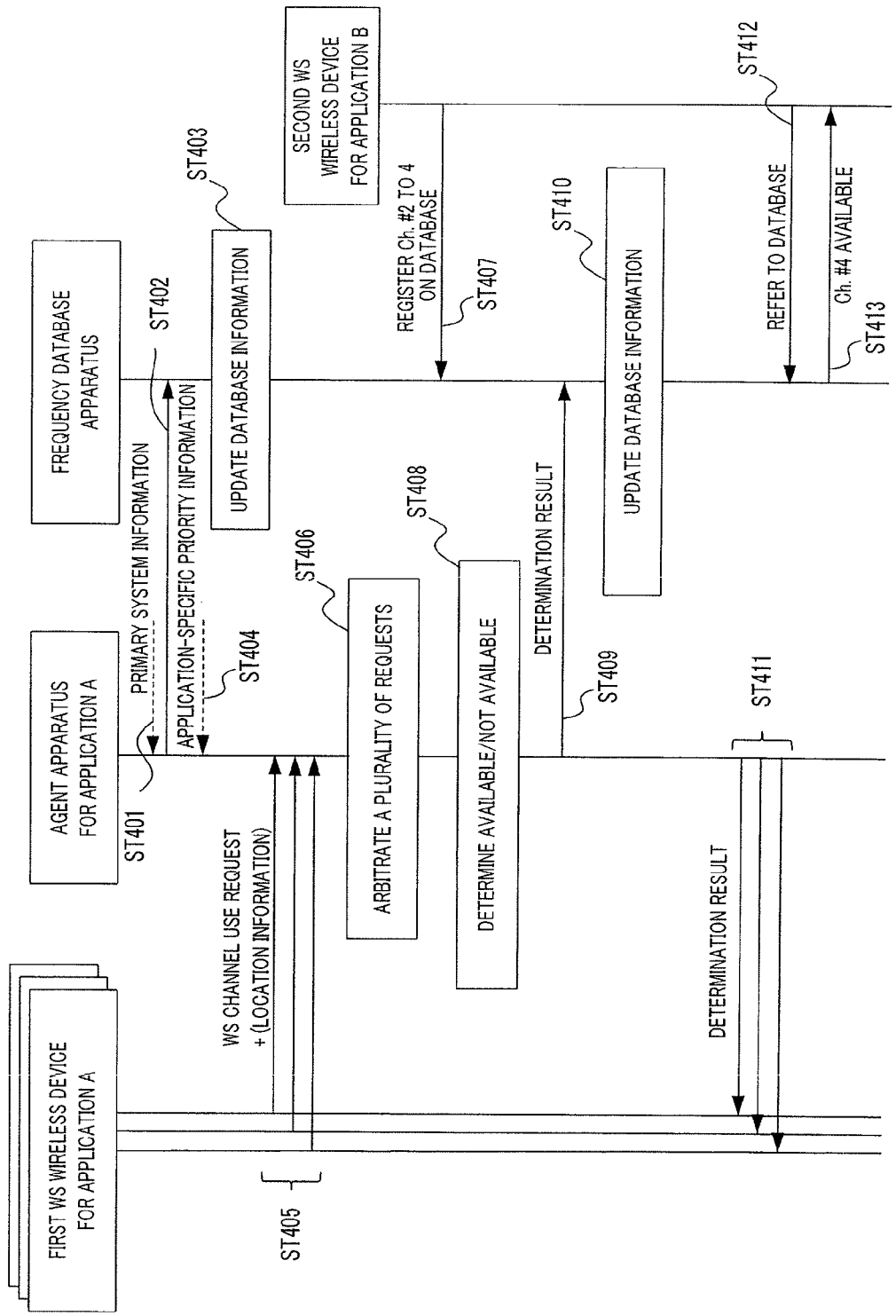
FIG. 7 is a sequence diagram for describing a WS sharing control method according to Embodiment 2 of the present invention.

FIG. 7 is a sequence diagram for describing a WS sharing control method according to Embodiment 2 of the present invention. In FIG. 7, in ST401, the agent apparatus for application A regularly obtains information related to a channel used by the primary system (primary system information). In ST402, the agent apparatus for application A instructs a frequency database apparatus to update frequency database information representing an available channel and an unavailable channel for each application. Note that, primary system information is created by a radio frequency management organization superior to the agent apparatus for application A and the frequency database apparatus. The agent apparatus for application A and the frequency database apparatus cannot change the content of the primary system information.

In ST403, the frequency database apparatus receives an instruction from the agent apparatus for application A, and updates the frequency database information.

In ST404, the agent apparatus for application A regularly obtains the application-specific priority information, and refers to the information when performing use-permission control between WS users. Note that, the application-specific priority information is created by a radio frequency management organization superior to the agent apparatus for application A. The agent apparatus for application A cannot change the content of the information.

In ST405, a plurality of the first WS wireless devices for application A transmits a WS channel use request to the agent apparatus for application A. Note that, the first WS wireless device may also transmit location information of the wireless device to the agent apparatus as necessary. The location information is information obtained by the GPS or another positioning technique.

In ST 406, the agent apparatus for application A arbitrates WS channel use requests received from a plurality of first WS wireless devices, and combines the plurality of WS channel use requests into one request for application A.

In ST407, the second WS wireless device for application B having priority lower than application A registers, on the frequency database apparatus, the use of channels #2 to 4 (Ch. #2 to 4) as WS channels.

In ST408, the agent apparatus for application A determines availability for application A and application B, based on "arbitrated WS channel use request and location information" and "application-specific priority information". In ST409, the agent apparatus for application A transmits the determination result to the frequency database apparatus. Among WS channels being used for application B (channels #2 to 4), the agent apparatus for application A determines the channels #2 and 3 as available for application A, and determines only the channel #4 as available for application B.

In ST410, the frequency database apparatus updates the database information for application A and the database information for application B, based on the determination result received from the agent apparatus for application A.

In ST411, the agent apparatus for application A transmits the determination result for application A to the plurality of the first WS wireless devices.

In ST412, the second WS wireless device refers to database information owned by the frequency database apparatus. In ST413, the second WS wireless device obtains information that only the channel #4 (Ch. #4) is available for application B.

With the control, even when a use request for application A with higher priority arises for a WS channel being in use for application B which has lower priority, the WS channel becomes available for application A.

As a result, the update status of frequency database information in the WS sharing control method illustrated in FIG. 7 is as illustrated in FIG. 4 in Embodiment 1, before and after the update in ST410.

Figure 8:
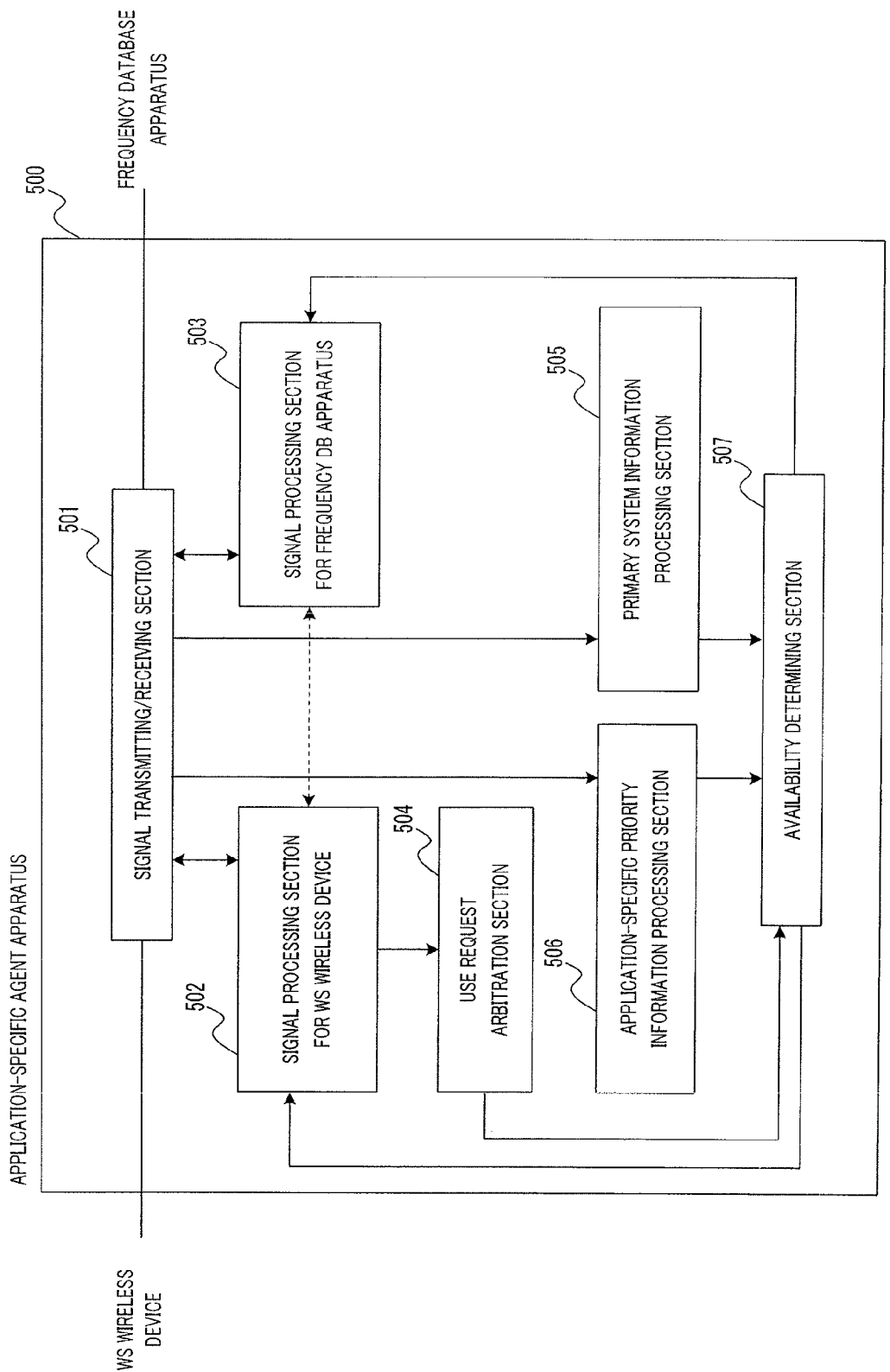
FIG. 8 is a block diagram illustrating a configuration of an application-specific agent apparatus according to Embodiment 2 of the present invention.

FIG. 8 is a block diagram illustrating the configuration of application-specific proxy apparatus 500 according to Embodiment 2 of the present invention. In FIG. 8, signal transmitting/receiving section 501 transmits and receives signals between the WS wireless device and the frequency database apparatus. More specifically, signal transmitting/receiving section 501 outputs signals received from a WS wireless device to signal processing section for WS wireless device 502, and signals received from the frequency database apparatus to signal processing section for frequency database apparatus 503. In addition, signal transmitting/receiving section 501 transmits the transmission signals output from signal processing section for WS wireless device 502 to a WS wireless device, and transmits the transmission signals output from signal processing section for frequency database apparatus 503 to the frequency database apparatus. Note that, signal transmitting/receiving section 501 receives the primary system information and the application-specific priority information from a superior radio frequency management organization via a frequency database apparatus or another means (not illustrated), and outputs the received primary system information and the application-specific priority information to primary system information processing section 505 and application-specific priority information processing section 506, respectively.

Signal processing section for WS wireless device 502 performs processing according to the signal received from signal transmitting/receiving section 501 and generates a transmission signal for the WS wireless device. The generated transmission signal is provided to signal transmitting/receiving section 501. Furthermore, when the signals received from signal transmitting/receiving section 501 are WS channel use request from a plurality of WS wireless devices, signal processing section for WS wireless device 502 outputs a WS channel use request to use request arbitration section 504.

Signal processing section for frequency database apparatus 503 generates a transmission signal for a process according to the signal received from signal transmitting/receiving section 501 and for a frequency database apparatus. The generated transmission signal is provided to signal transmitting/receiving section 501.

Use request arbitration section 504 combines a plurality of WS channel use requests from a plurality of WS wireless devices output from signal processing section for WS wireless device 502 into one use request, and outputs the combined WS channel use request to availability determining section 507.

Primary system information processing section 505 performs a predetermined process on primary system information from the superior radio frequency management organization output from signal transmitting/receiving section 501, and outputs the information to availability determining section 507.

Application-specific priority information processing section 506 performs a predetermined process on the application-specific priority information from the superior radio frequency management organization output from signal transmitting/receiving section 501, and outputs the information to availability determining section 507.

Availability determining section 507 determines availability of WS for application A and application B, based on an arbitrated WS channel use request output from use request arbitration section 504, the primary system information output from primary system information processing section 505, and the application-specific priority information output from application-specific priority information processing section 506. Availability determining section 507 outputs the determination result to signal processing section for WS wireless device 502 and signal processing section for frequency database apparatus 503.

Figure 9:
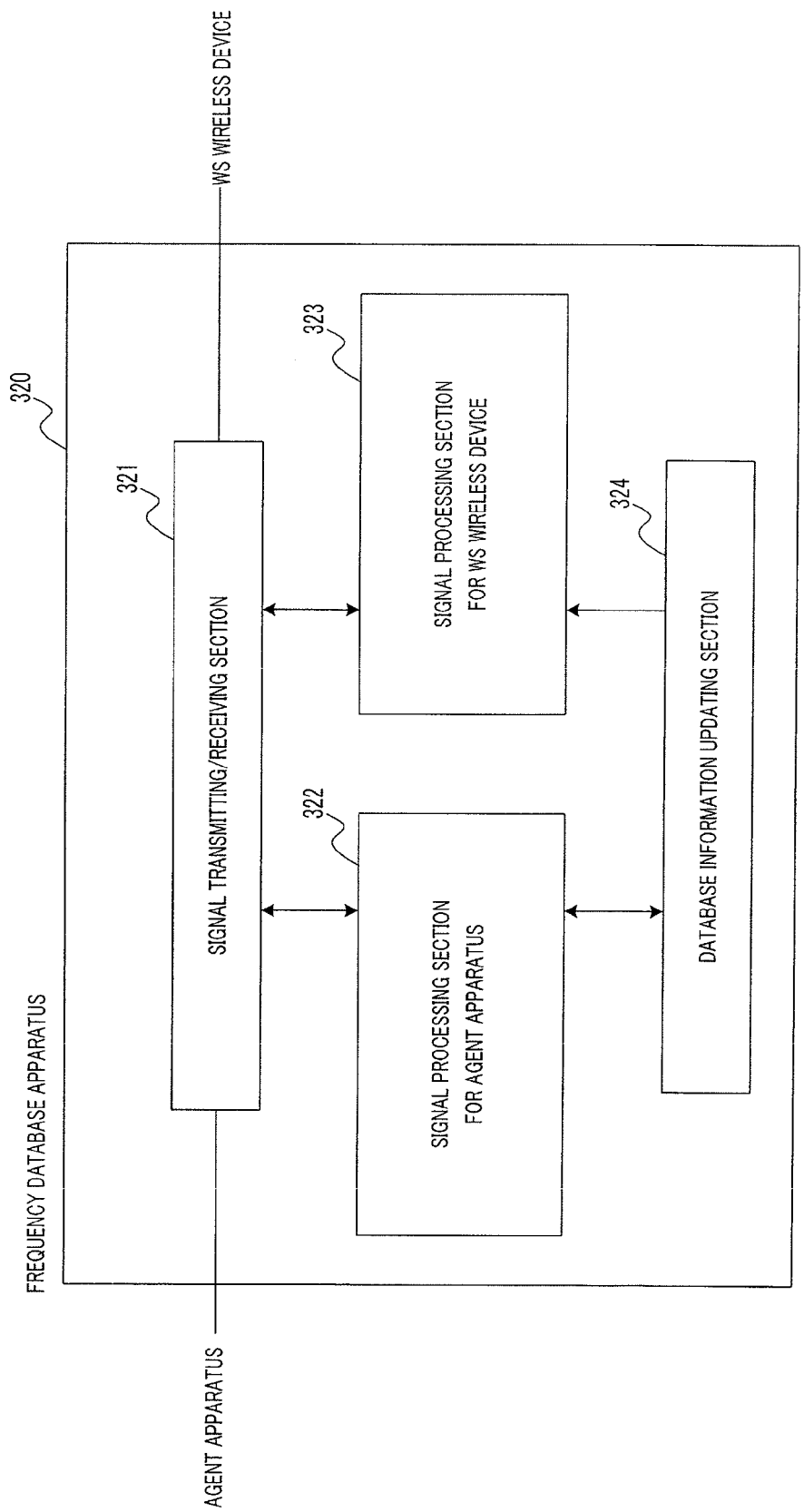
FIG. 9 is a block diagram illustrating a configuration of a frequency database apparatus according to Embodiment 2 of the present invention.

FIG. 9 is a block diagram illustrating the configuration of frequency database apparatus 320 according to Embodiment 2 of the present invention. In FIG. 9, signal transmitting/receiving section 321 transmits/receives signals between the application-specific agent apparatus and the WS wireless device. More specifically, signal transmitting/receiving section 321 outputs the signal received from the application-specific agent apparatus to signal processing section for agent apparatus 322, and outputs the signal received from the WS wireless device to signal processing section for WS wireless device 323. In addition, signal transmitting/receiving section 321 transmits the transmission signals output from signal processing section for agent apparatus 322 to the application-specific agent apparatus, and transmits the transmission signals output from signal processing section for WS wireless device 323 to the WS wireless device.

Signal processing section for agent apparatus 322 performs processing according to the signal received from signal transmitting/receiving section 321 and generates a transmission signal for the agent apparatus. The generated transmission signal is provided to signal transmitting/receiving section 321. In addition, when the signal received from signal transmitting/receiving section 321 is a determination result on availability, signal processing section for agent apparatus 322 outputs the determination result to database information updating section 324.

Signal processing section for WS wireless device 323 performs processing according to the signal received from signal transmitting/receiving section 321 and generates a transmission signal for the WS wireless device. The generated transmission signal is provided to signal transmitting/receiving section 321.

Database information updating section 324 updates the database information for application A and the database information for application B based on the determination result on the availability output from signaling section for agent apparatus 322. Furthermore, database information updating section 324 outputs database updating information in response to an inquiry from signaling section for agent apparatus 322 and signal processing section for WS wireless device 323.

As described above, according to Embodiment 2, each application of WS can be prioritized in advance, and the application-specific agent apparatus determines availability of a WS channel according to the application-specific priority. With this, even when a use request for application with a higher priority arises while a WS channel is being used for an application in lower priority, the WS channel can be made available for the application in higher priority, and thus the application of WS can be controlled.

Note that, in Embodiment 2, the transmission/reception between the WS wireless device and an agent apparatus for application A, between the WS wireless device and a frequency database apparatus, and between the agent apparatus for application A and the frequency database may be either wireless or wired transmission. Furthermore, in the case of wireless transmission, the transmission/reception may be performed on a wireless system operated on the WS or a wireless system operated outside of WS.

Embodiment 3

Figure 10:
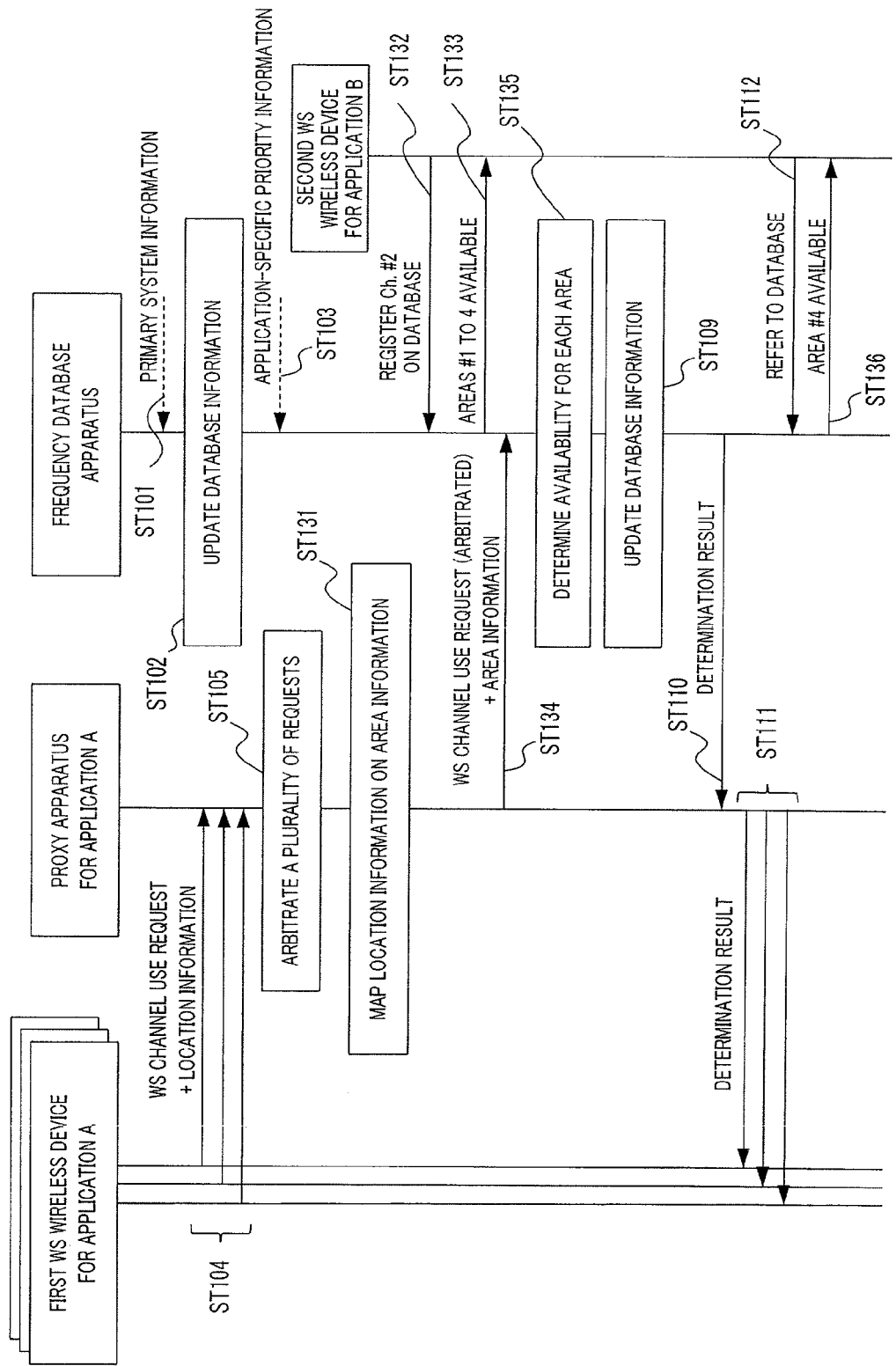
FIG. 10 is a sequence diagram for describing a WS sharing control method according to Embodiment 3 of the present invention.

FIG. 10 is a sequence diagram for describing a WS sharing control method according to Embodiment 3 of the present invention. The same reference numerals as FIG. 3 are assigned to components in FIG. 10 common to the components in FIG. 3, and description for these components will be omitted. In FIG. 10, in ST131, a proxy apparatus for application A maps location information received from the first WS wireless device for application A on area information. The operation is for determining whether the WS channels are available for each area. The area information here may be information obtained by converting location information obtained by the GPS and others into a status that can be classified in wireless control by a base station, for example. Using the area information, in a cell finely divided into sectors, the location of the first WS wireless device may be mapped into area information such as "an area covered by the x-th sector".

In ST132, the second WS wireless device for application B in which the priority is set to be lower than application A registers the use of channel #2 (Ch. 2) as a WS channel. In ST133, the second WS wireless device obtains, from the frequency database apparatus, information that the areas #1 to 4 in the channel #2 (Areas #1 to 4) are available for application B.

In ST134, the proxy apparatus for application A transmits the arbitrated WS channel use request and the area information to the frequency database apparatus.

In ST135, the frequency database apparatus determines availability of application A and application B for each area, based on "arbitrated WS channel use request and area information" and "application-specific priority information". Here, it is determined that, among areas #1 to #4 in WS channel being used for application B (channel #2), areas #1 to 3 are determined as available for application A, and only area #4 is determined as available for application B.

In ST136, the second WS wireless device obtains information that only area #4 in channel #2 is available for application B.

With the control, even when a use request for application A with higher priority arises for a WS channel being in use for application B which has lower priority, the WS channel becomes available for application A. In addition, by limiting the available area for application A, even within the coverage of a wireless system for application A, the same WS channel can be available for application B in an area where there is no interference on application A. As a result, limited resource can be effectively used.

Figure 11A:
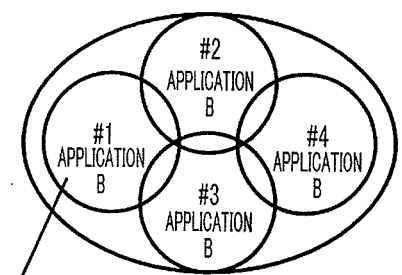
FIGS. 11A and 11B represent update statuses of frequency database information in WS sharing control method illustrated in FIG. 10.
Figure 11B:
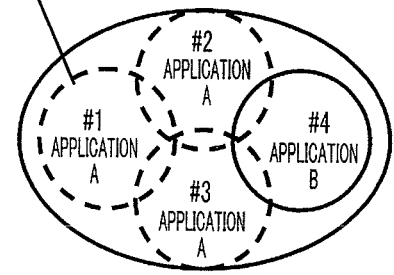

FIGS. 11A and 11B represent update statuses of frequency database information in WS sharing control method illustrated in FIG. 10. FIG. 11A represents frequency database information before an update at ST109 in FIG. 10. More specifically, areas #1 to 4 in channel #2 (Ch. #2) are available for WS for application B.

FIG. 11B represents frequency database information after an update at ST109 in FIG. 10. More specifically, FIG. 11B represents that areas #1 to 3 in channel #2 (Ch. #2) are available for the first WS wireless device for application A, and only area #4 in channel #2 (Ch. #2) is available for the second WS wireless device for application B.

Figure 12:
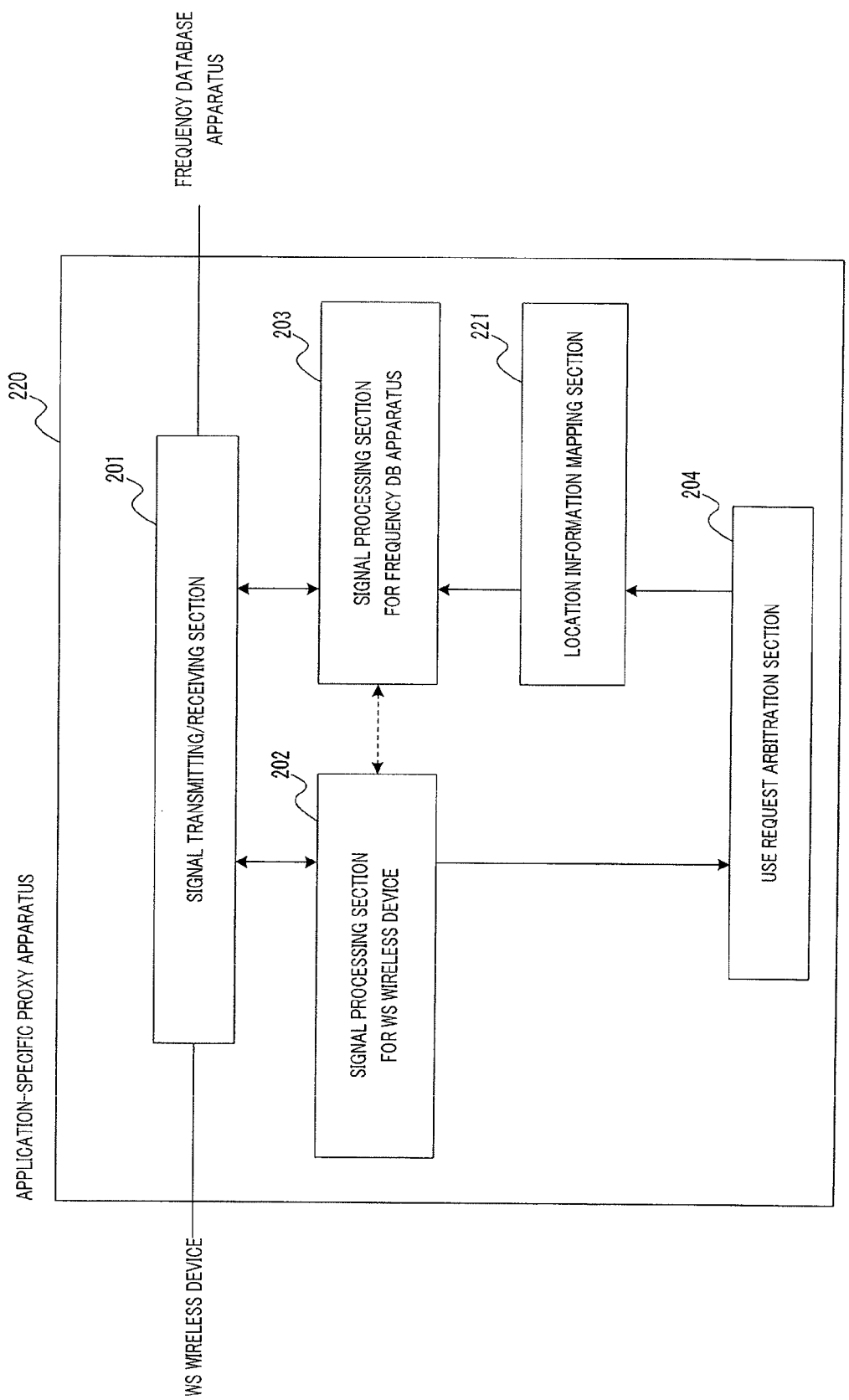
FIG. 12 is a block diagram illustrating a configuration of an application-specific proxy apparatus according to Embodiment 3 of the present invention.

FIG. 12 is a block diagram illustrating the configuration of application-specific proxy apparatus 220 according to Embodiment 3 of the present invention. FIG. 12 is different from FIG. 5 in that location information mapping section 221 is added.

Location information mapping section 221 maps location information of the WS wireless device output from use request arbitration section 204 for each area, and generates the area information. The generated area information is output to signal processing section for frequency database apparatus 203.

Figure 13:
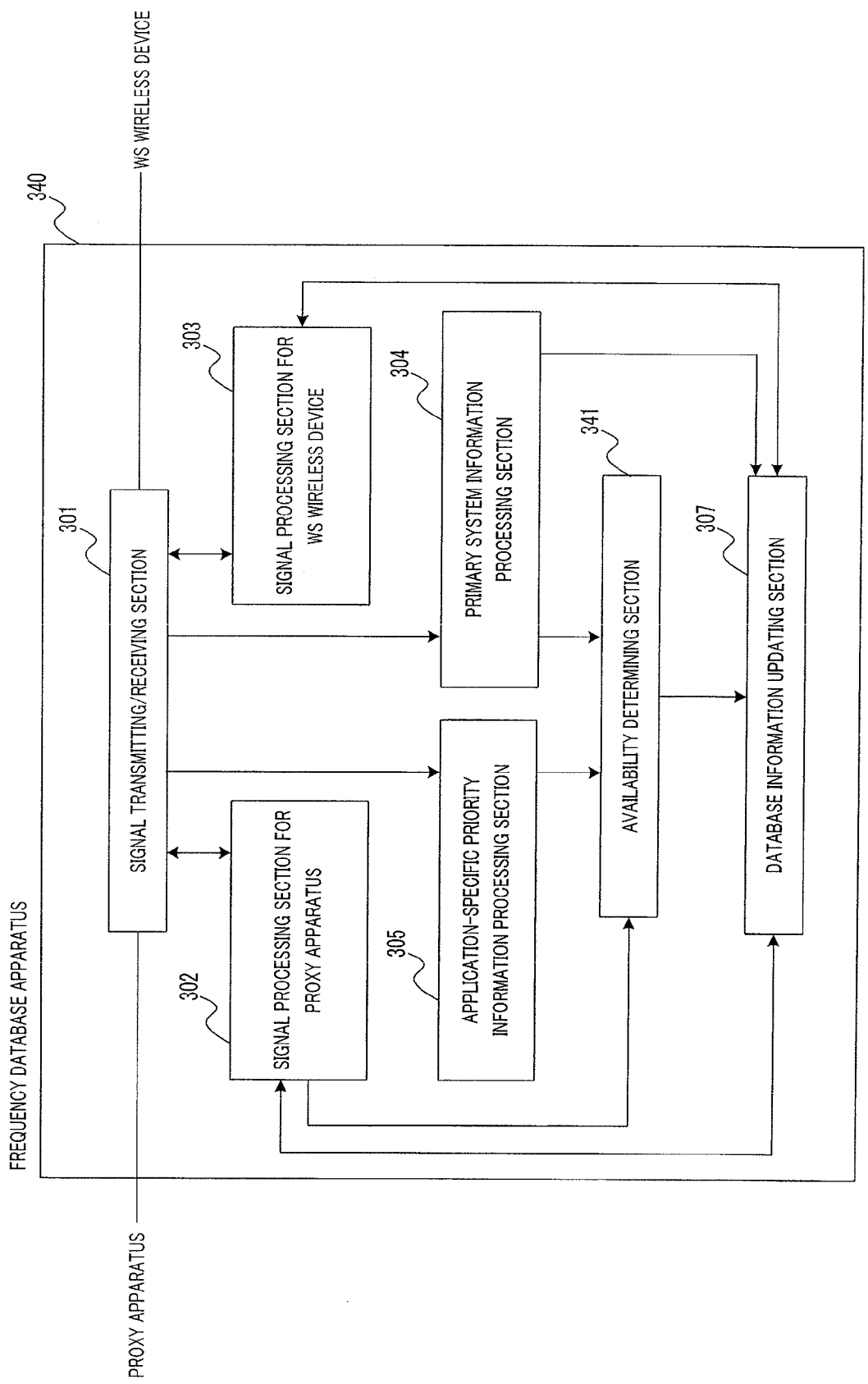
FIG. 13 is a block diagram illustrating a configuration of a frequency database apparatus according to Embodiment 3 of the present invention.

FIG. 13 is a block diagram illustrating the configuration of frequency database apparatus 340 according to Embodiment 3 of the present invention. FIG. 13 is different from FIG. 6 in that availability determining section 306 is replaced with availability determining section 341.

Availability determining section 341 determines availability for application A and application B for each area based on the arbitrated WS channel use request and area information from application-specific proxy apparatus output from signal processing section for proxy apparatus 302, the primary system information output from primary system information processing section 304, and the application-specific priority information output from application-specific priority information processing section 305. Availability determining section 341 outputs the determination result to database information updating section 307.

As described above, according to the technique in Embodiment 3, priority is determined for each application in advance, and the availability of the WS channel is determined according to the priority of each application, for each area mapping location information of the WS wireless device performing use-request of the WS channel. With this, an available area for an application with higher priority is limited, and the same WS channel can be made available to an application with lower priority in an area that does not interfere with the application with higher priority. As a result, limited resource can be effectively used.

Figure 14:
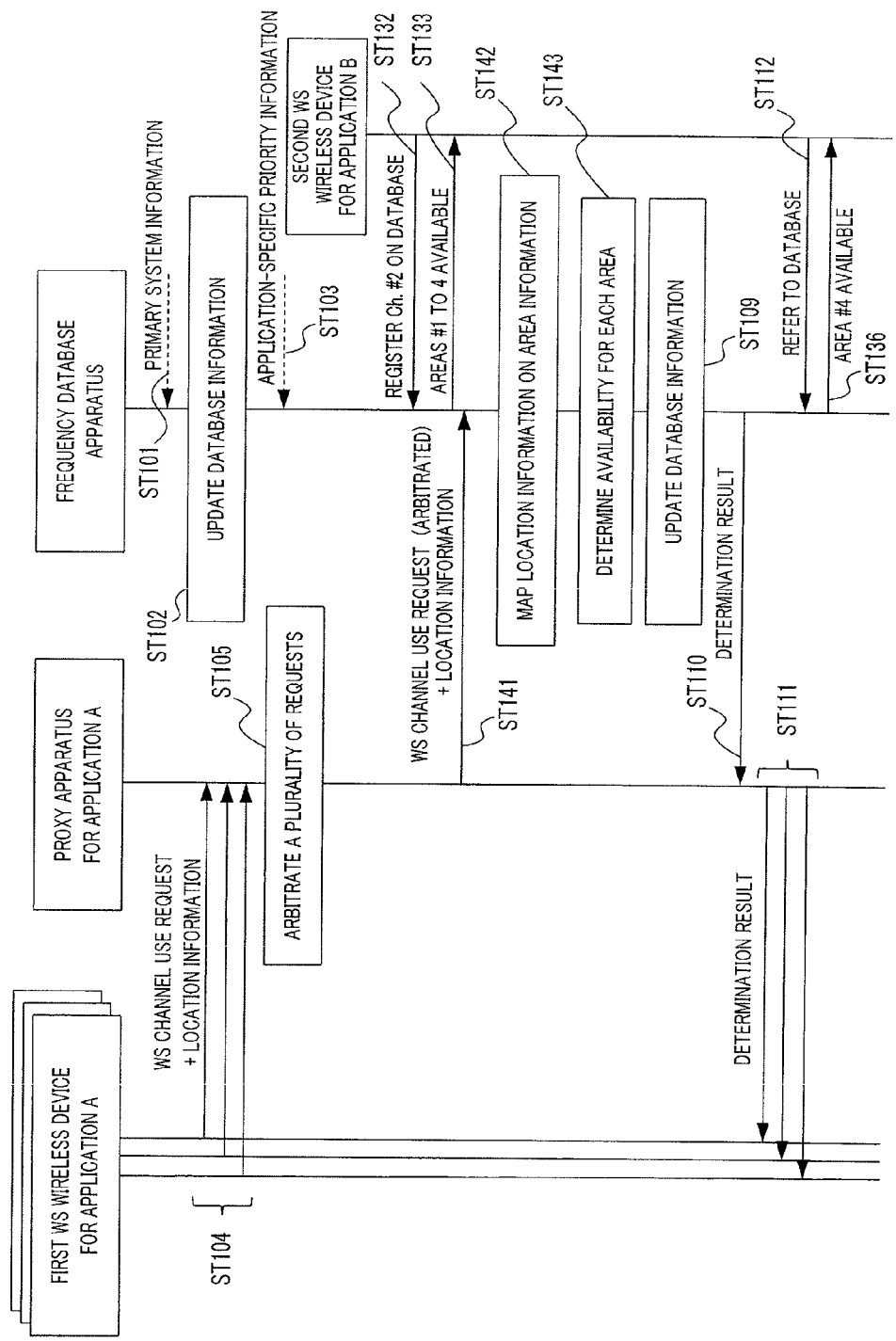
FIG. 14 is a sequence diagram for describing a WS sharing control method when a location information mapping section is implemented on a frequency database apparatus.

Note that, in embodiment 3, the description is made based on a case in which the location information mapping section is implemented in application-specific proxy apparatus. However, the present invention is not limited to this example. For example, the location information mapping section may be implemented in the frequency database apparatus of the application-specific agent apparatus. The following is description of a case in which the location information mapping section is implemented in the frequency database apparatus as shown in FIG. 14. However, note that the description for FIG. 14 only includes difference from FIG. 10.

In ST141, the proxy apparatus for application A transmits the arbitrated WS channel use request and the location information to the frequency database apparatus. In ST142, the frequency database apparatus maps the location information received from the proxy apparatus for application A on the area information.

In ST143, the frequency database apparatus determines availability of application A and application B for each area, based on "arbitrated WS channel use request and area information" and "application-specific priority information".

Figure 15:
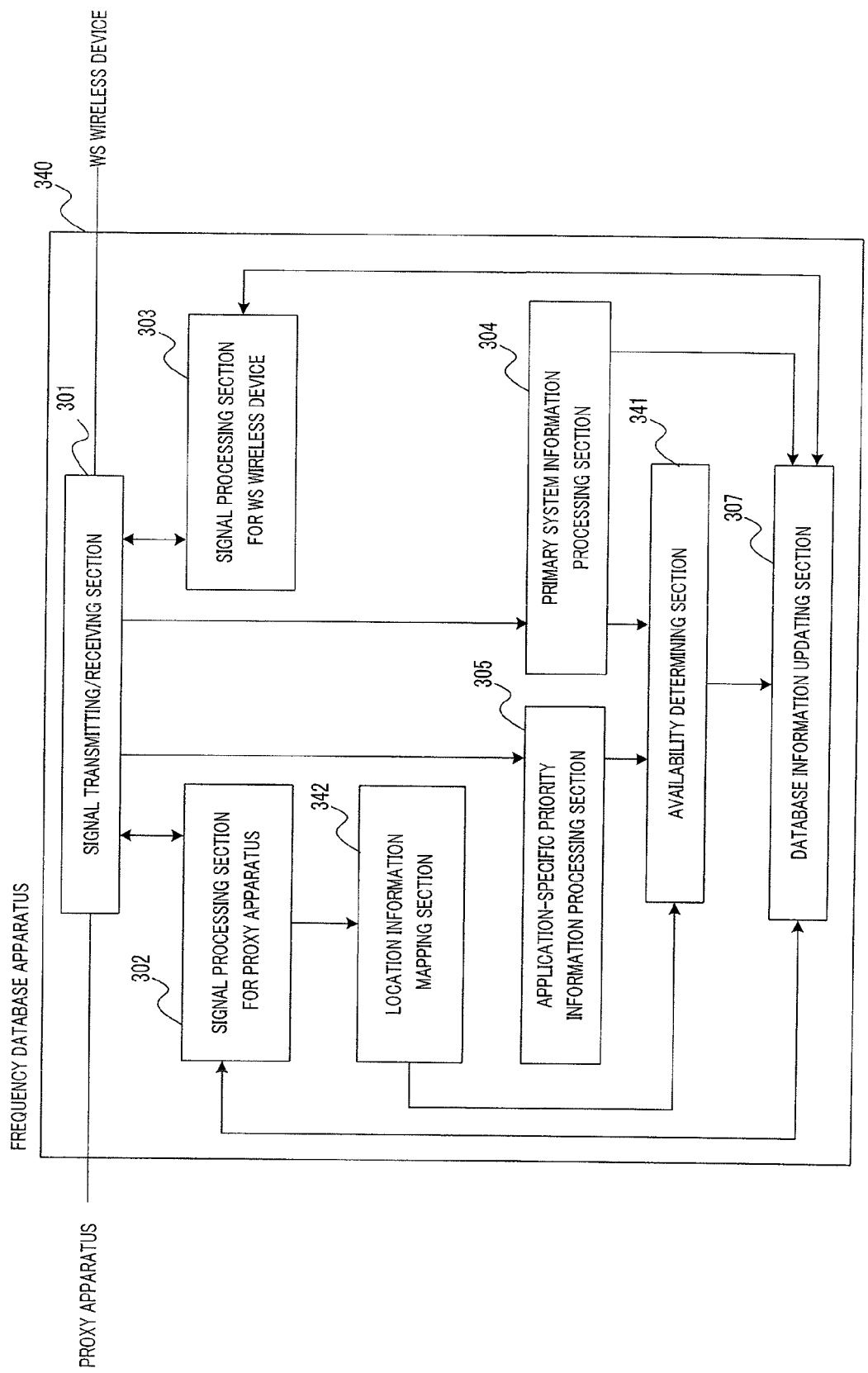
FIG. 15 is a block diagram illustrating a configuration of a frequency database apparatus illustrated in FIG. 14.

The proxy apparatus for application A illustrated in FIG. 14 has a configuration identical to the configuration according to Embodiment 1 illustrated in FIG. 5, and the frequency database apparatus illustrated in FIG. 14 has the configuration illustrated in FIG. 15. The frequency apparatus in FIG. 15 includes location information mapping section 342 in addition to the configuration illustrated in FIG. 13. Location information mapping section 342 generates the area information by mapping the location information of the WS wireless device output from signal processing section for proxy apparatus 302 for each area, and outputs the generated area information to availability determining section 341.

The case in which the location information mapping section is implemented on the application-specific agent apparatus will be described with reference to FIG. 16. However, note that the description for FIG. 16 only includes difference from FIG. 7.

In ST421, the second WS wireless device registers the use of the channel #2 (Ch. #2) as the WS channel on the frequency database apparatus. In ST422, the second WS wireless device obtains information that the areas #1 to 4 in the channel #2(Ch. #2) is available for application B from the frequency database apparatus.

In ST423, the agent apparatus for application A maps the location information received from the first WS wireless device for application A on the area information. In ST424, the agent apparatus for application A determines availability for application A and application B for each area, based on "arbitrated WS channel use request and area information", "application-specific priority information" and "primary system information".

In ST425, the second WS wireless device obtains information that only the area #4 in the channel #2 (Ch. #2) is available for application B from the frequency database apparatus.

Figure 16:
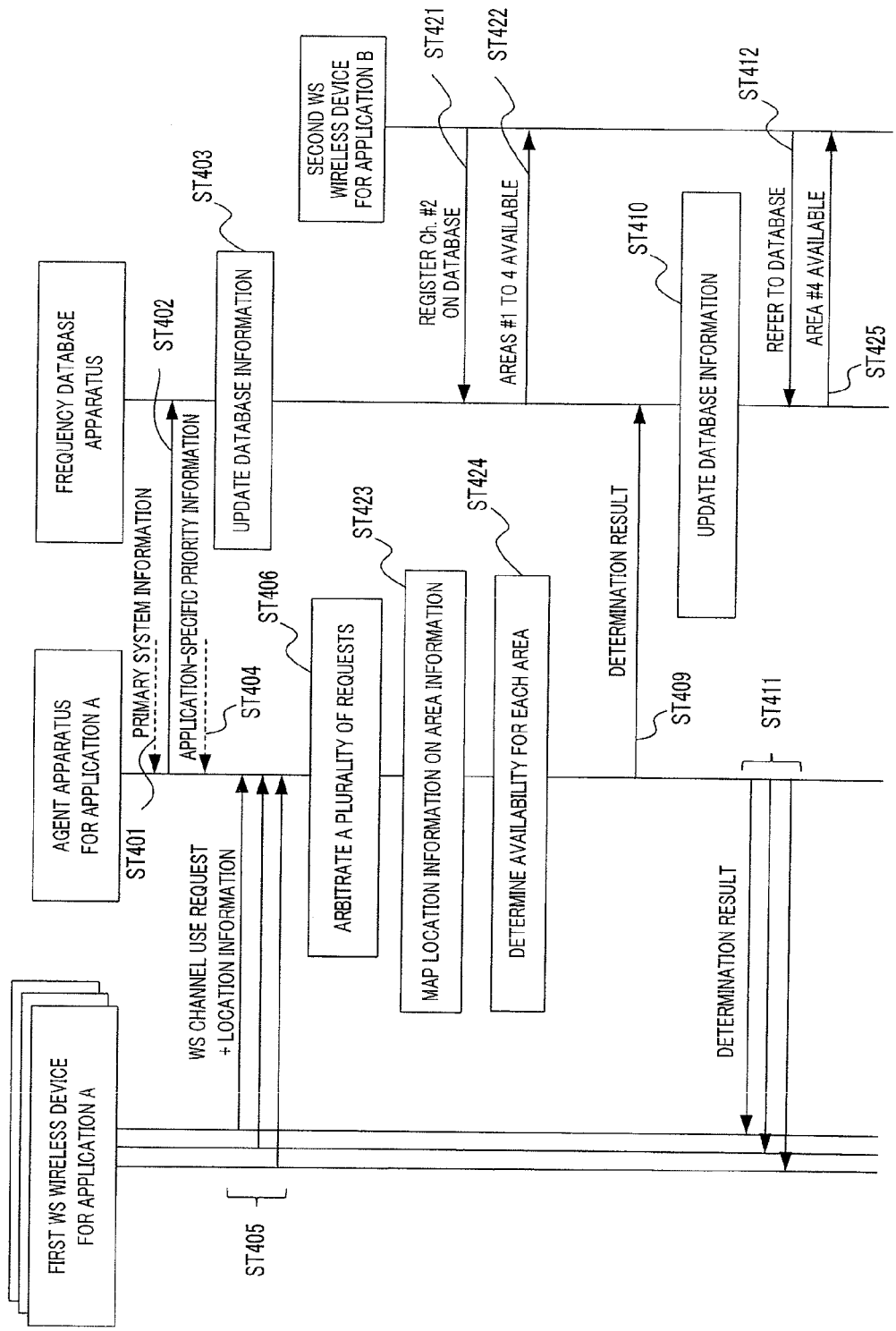
FIG. 16 is a sequence diagram for describing a WS sharing control method when a location information mapping section is implemented on an application-specific agent apparatus.
Figure 17:
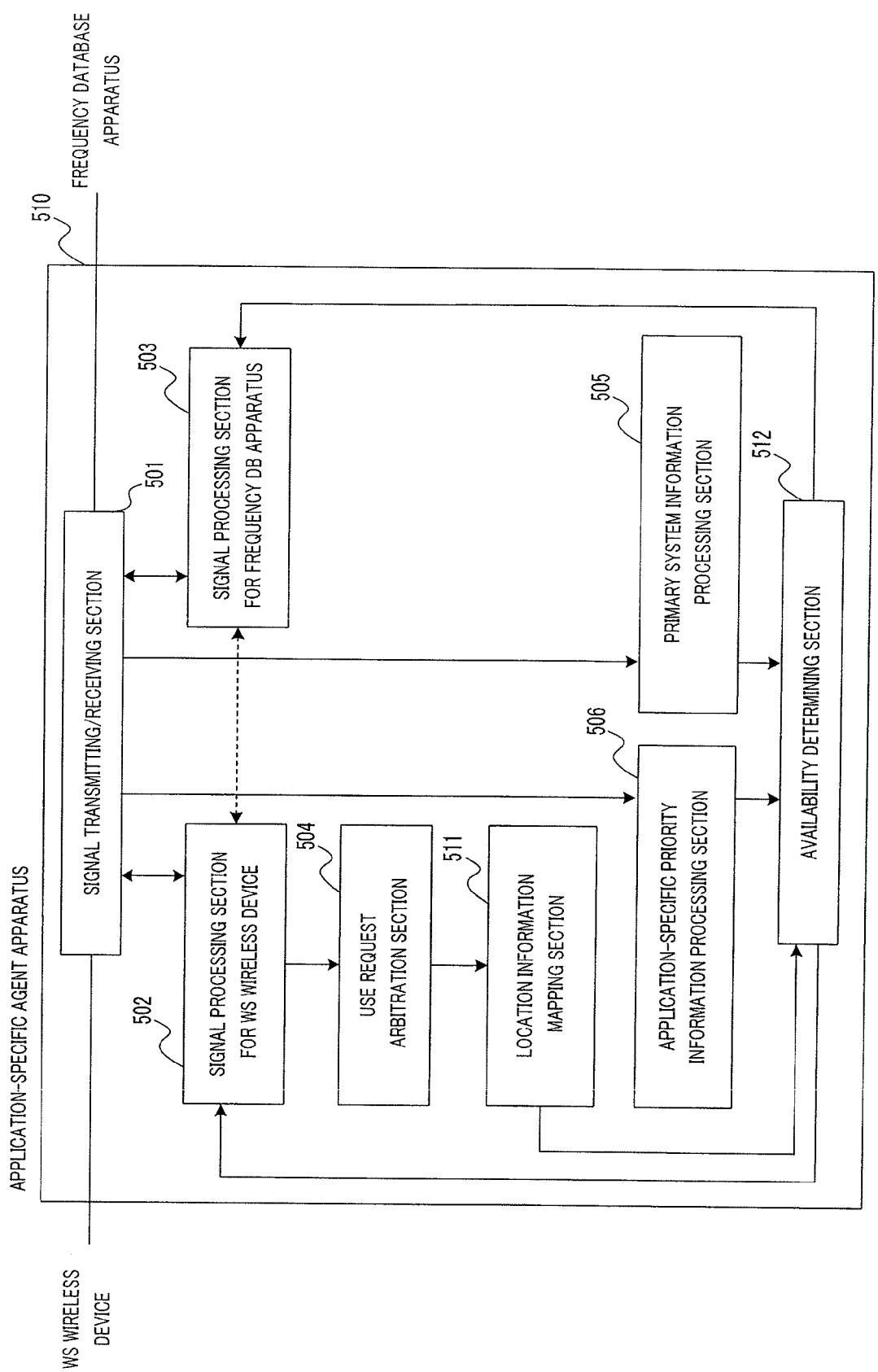
FIG. 17 is a block diagram illustrating a configuration of an application-specific agent apparatus illustrated in FIG. 16.

The frequency database apparatus illustrated in FIG. 16 has the configuration identical to the configuration according to Embodiment 2 illustrated in FIG. 9. The application-specific agent apparatus illustrated in FIG. 16 has the configuration illustrated in FIG. 17. The application-specific agent apparatus illustrated in FIG. 17 includes location information mapping section 511 in addition to the configuration illustrated in FIG. 8, and availability determining section 507 is replaced with availability determining section 512. Location information mapping section 511 generates area information by mapping the location information output from use request arbitration section 504 for each area, and outputs the generated area information to availability determining section 512. In addition, location information mapping section 511 outputs the arbitrated WS channel use request output from use request arbitration section 504 to availability determining section 512.

Availability determining section 512 determines availability for application A and application B for each area, based on the arbitrated WS channel use request and the area information output from location information mapping section 511, the primary system information output from primary system information processing section 505, and the application-specific priority information output from application-specific priority information processing section 506. Availability determining section 512 outputs the determination result to signal processing section for WS wireless device 502 and signal processing section for frequency database apparatus 503.

Note that, in Embodiment 3, the transmission/reception between the WS wireless device and a proxy apparatus for application A, between the WS wireless device and the agent apparatus for application A, between the WS wireless device and a frequency database, between the proxy apparatus for application A and the frequency database apparatus, and between the agent apparatus for application A and the frequency database apparatus may be either wireless or wired transmission. Furthermore, in the case of wireless transmission, the transmission/reception may be performed on a wireless system operated on the WS or a wireless system operated outside of WS.

Embodiment 4

Figure 18:
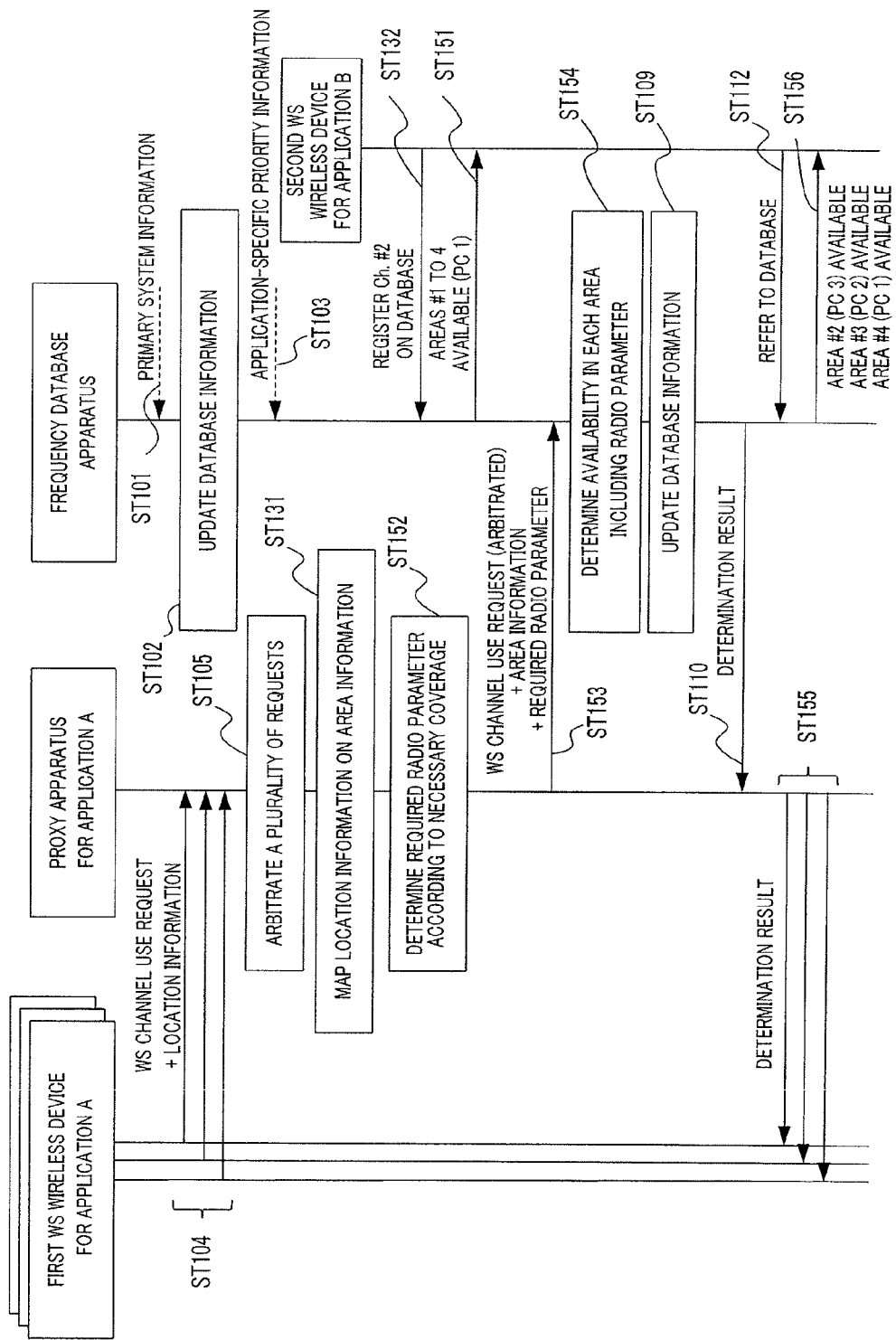
FIG. 18 is a sequence diagram for describing a WS sharing control method according to Embodiment 4 of the present invention.

FIG. 18 is a sequence diagram for describing a WS sharing control method according to Embodiment 4 of the present invention. The same reference numerals in FIG. 10 are assigned to components in FIG. 18 common to the components in FIG. 10, and description for these components will be omitted. In ST151, the second WS wireless device obtains, from the frequency database apparatus, the information representing that the channel #2 (Ch. #2) is available as the WS channel at transmission power (power class) PC1 in each of areas #1 to 4.

In ST152, the proxy apparatus for application A determines the required radio parameter such as the transmission power in order to set a communication coverage necessary for the application A appropriately. Here, the proxy apparatus for application A can determine the required radio parameters such as the direction of beamforming, the width of the beam, the transmission power, and so on by using the positional relationship between a terminal and a base station, or a required transmission speed.

In ST153, the proxy apparatus for application A transmits the arbitrated WS channel use request, the area information, and the required radio parameter information to the frequency database apparatus.

In ST154, the frequency database apparatus determines availability for application A and application B for each area, based on "arbitrated WS channel use request and area information", "application-specific priority information" and "primary system information." The frequency database apparatus also sets the radio parameter for each area, based on the area information and the required radio parameter. Among the areas #1 to 4 of the WS channel (channel #2) being used for application B, area #1 is determined as available for application A in power class PC1 and with beamforming, and determines the areas #2 to 4 as available for application B in power class PC3, PC2, PC1 (PC1>PC2>PC3), respectively.

In ST155, the proxy apparatus for application A transmits the determination result received from the frequency database apparatus (availability information and radio parameter information) to a plurality of the first WS wireless devices for application A.

In ST156, the second WS wireless device obtains, from the frequency database apparatus, the information that the areas #2 to 4 are available for application B in power class PC3, PC2, and PC1, respectively.

With the control, even when a use request for application A with higher priority arises for a WS channel being in use for application B which has lower priority, the WS channel becomes available for application A. Furthermore, by setting coverage of the wireless system for application A appropriately, the available area for application A is limited, and the same WS channel as the WS channel available for application A becomes available for application B. As a result, limited resource can be used more efficiently.

FIGS. 19A and 19B represent update statuses of frequency database information in WS sharing control method illustrated in FIG. 18. FIG. 19A represents frequency database information before the update at ST109 in FIG. 18. More specifically, WS is available for application B in areas #1 to 4 in channel #2 (Ch. #2) at power class PC1.

FIG. 19B represents frequency database information after the update at ST109 in FIG. 18. More specifically, the frequency database information represents that the area #1 in channel #2 (Ch. #2) is available for the application A in power class PC1 and with beamforming, and the areas #2 to 4 in channel #2 (Ch. #2) are available for application B in power classes PC3, PC2, PC1 (PC1>PC2>PC3), respectively.

Figure 20:
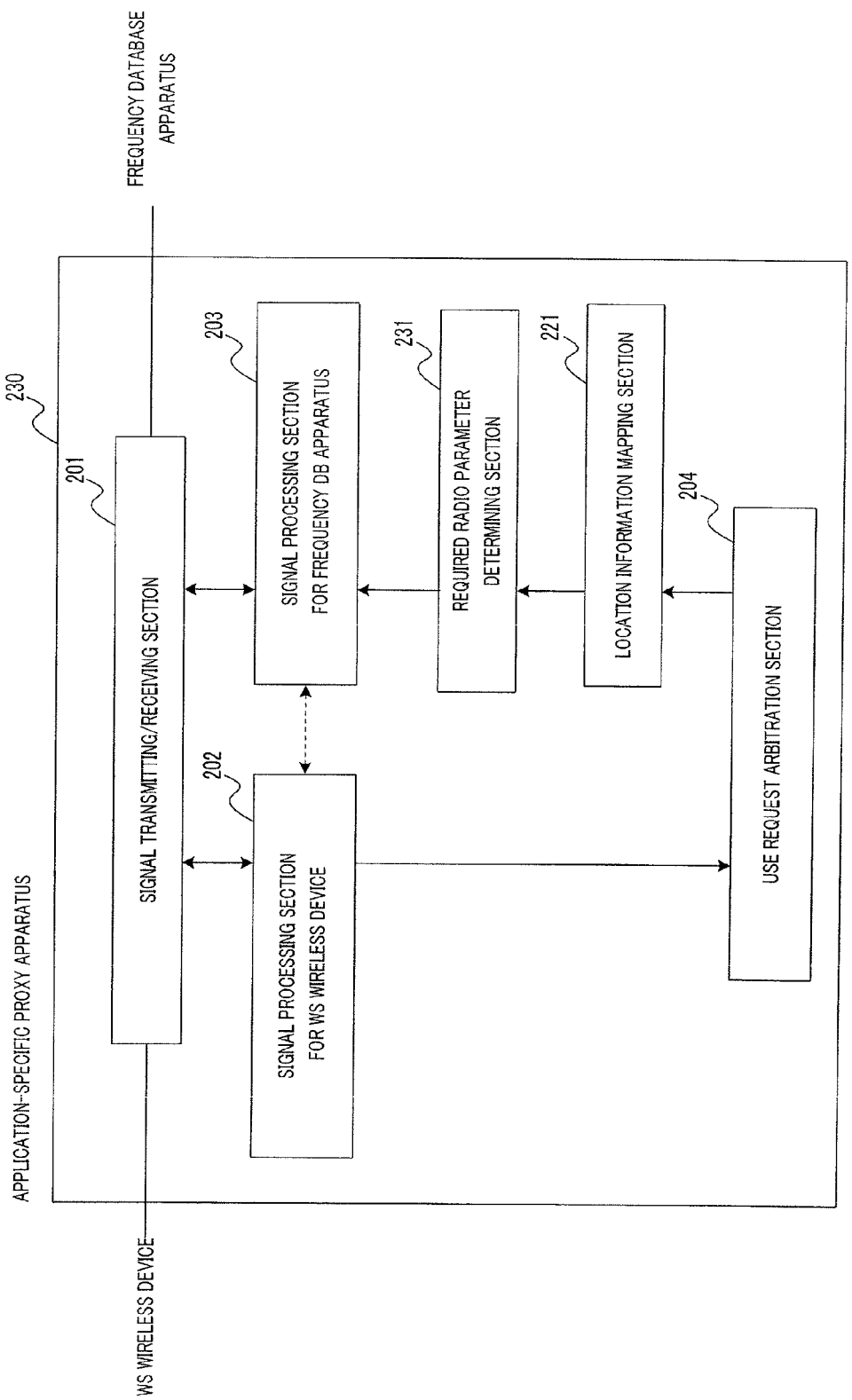
FIG. 20 is a block diagram illustrating a configuration of an application-specific proxy apparatus according to Embodiment 4 of the present invention.

FIG. 20 is a block diagram illustrating the configuration of application-specific proxy apparatus 230 according to Embodiment 4 of the present invention. The configuration in FIG. 20 is different from the configuration in FIG. 12 in that required radio parameter determining section 231 is added.

Required radio parameter determining section 231 determines, based on the area information output from location information mapping section 221, required radio parameters such as transmission power for setting a necessary communication coverage appropriately, and outputs the determined required radio parameter to signal processing section for frequency database apparatus 203. In addition, required radio parameter determining section 231 outputs the arbitrated WS channel use request output from location information mapping section 221 to signal processing section for frequency database apparatus 203.

Figure 21:
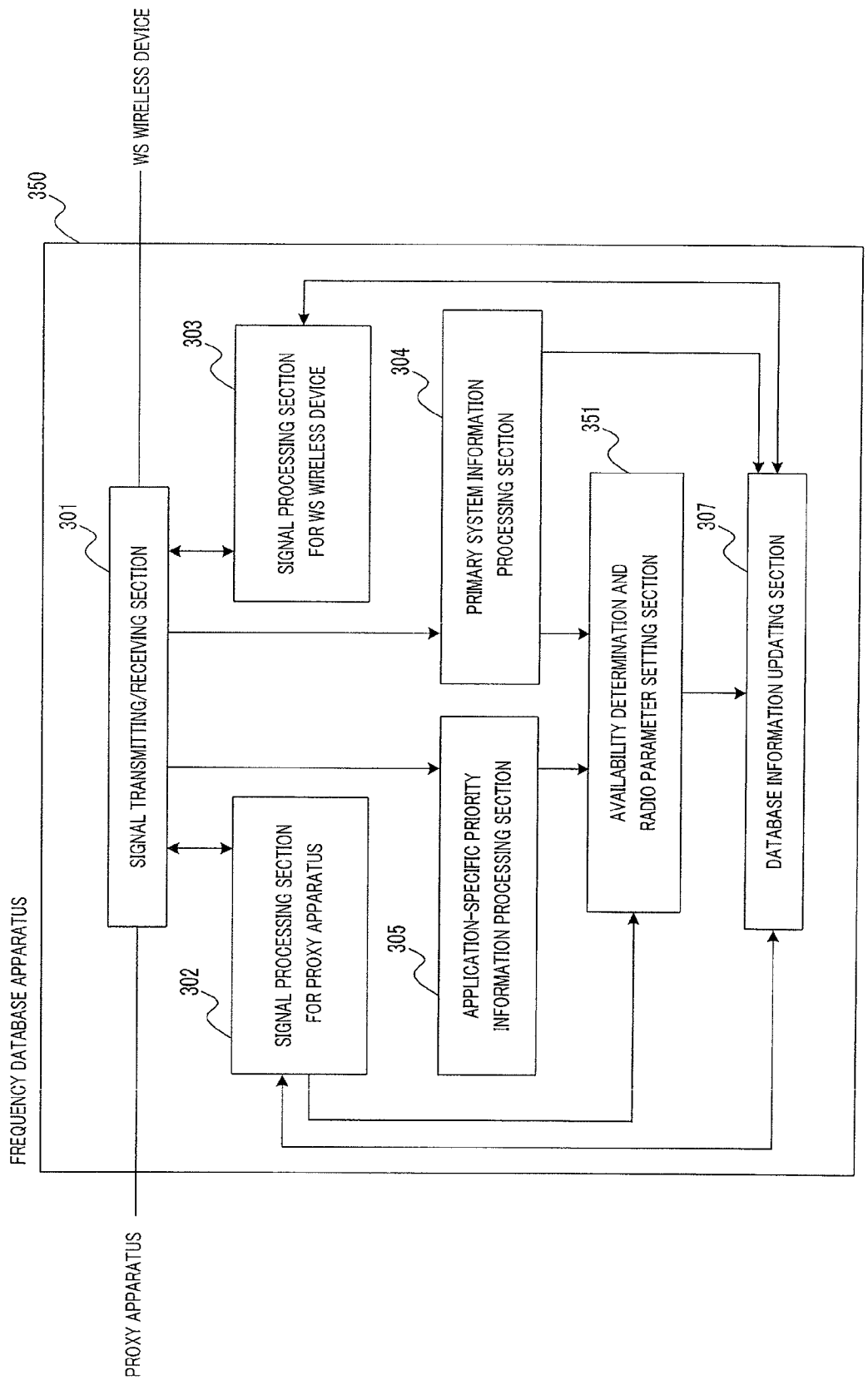
FIG. 21 is a block diagram illustrating a configuration of a frequency database apparatus according to Embodiment 4 of the present invention.

FIG. 21 is a block diagram illustrating the configuration of frequency database apparatus 350 according to Embodiment 4 of the present invention. The configuration illustrated in FIG. 21 is different from the configuration illustrated in FIG. 13 in that availability determining section 341 is replaced with availability determination and radio parameter setting section 351.

Availability determination and radio parameter setting section 351 sets radio parameters for application A and application B and determines availability for each area, based on "the arbitrated WS channel use request, the area information and the required radio parameter" from the application-specific proxy apparatus output form signal processing section for proxy apparatus 302, "primary system information" output from primary system information processing section 304, and "application-specific priority information" output from application-specific priority information processing section 305. The determination result is output to database information updating section 307 with the set radio parameter.

As described above, according to the technique in Embodiment 4, priority is determined for each application in advance, and the availability of the WS channel is determined according to the priority of each application, for each area mapping location information of the WS wireless device performing use-request of the WS channel, and the coverage of the wireless system for the application with high priority is set appropriately. With this, an available area for an application with higher priority is limited, and the same WS channel can be made available to an application with lower priority in an area that does not interfere with the application with higher priority. As a result, limited resource can be used even more efficiently.

Figure 22:
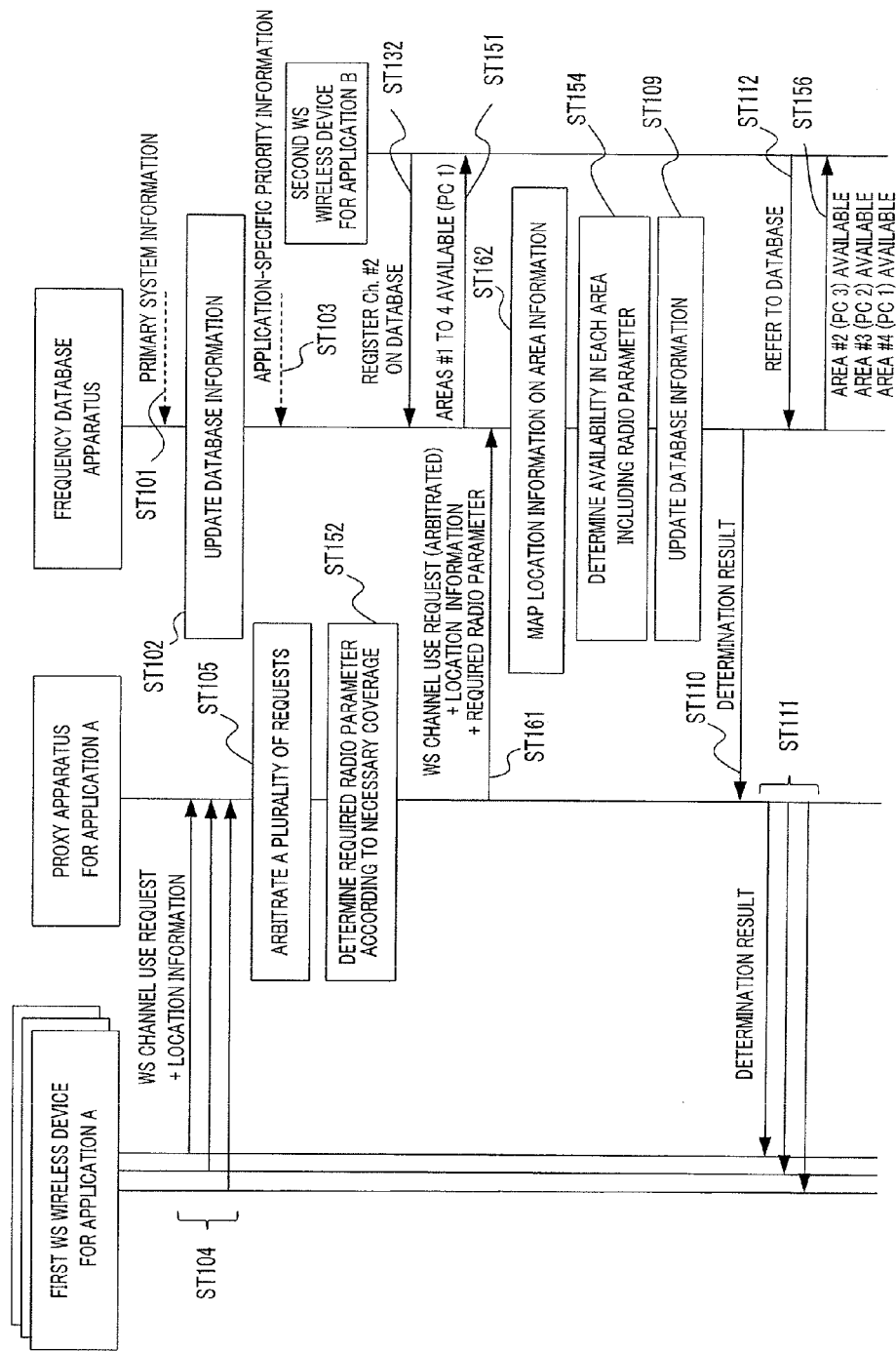
FIG. 22 is a sequence diagram for describing a WS sharing control method when a location information mapping section is implemented on a frequency database apparatus.

Note that, in Embodiment 4, the description is made based on a case in which the location information mapping section is implemented in an application-specific proxy apparatus. However, the present invention is not limited to this example. For example, the location information mapping section may be implemented in the frequency database apparatus or the application-specific agent apparatus. The following is description of a case in which the location information mapping section is implemented in the frequency database apparatus as shown in FIG. 22. However, note that the description for FIG. 22 only includes difference from FIG. 18.

In ST161, the proxy apparatus for application A transmits the arbitrated WS channel use request, the area information, and the required radio parameter information to the frequency database apparatus. In ST162, the frequency database apparatus maps the location information received from the proxy apparatus for application A on the area information.

Figure 23:
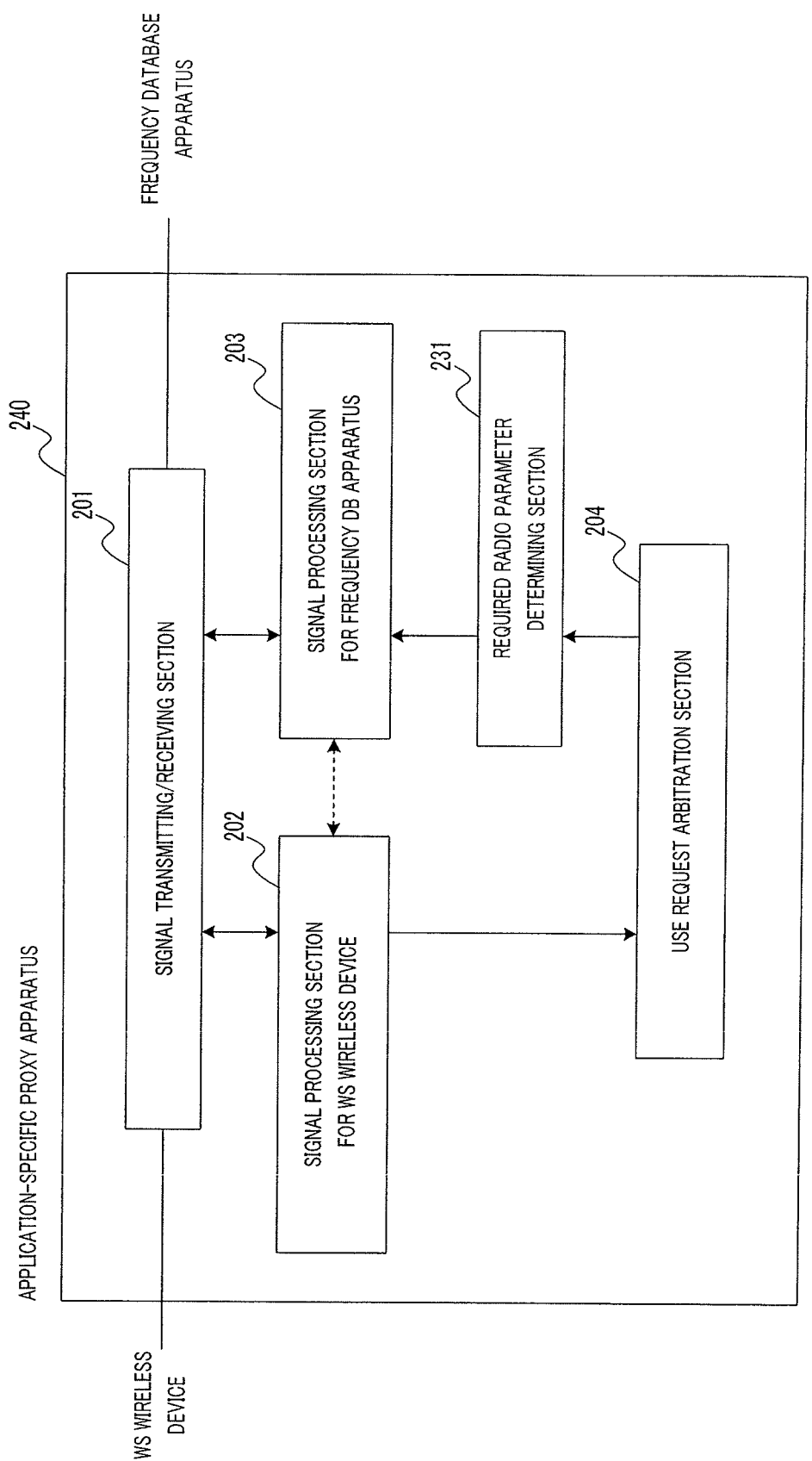
FIG. 23 is a block diagram illustrating a configuration of a proxy apparatus for application A illustrated in FIG. 22.
Figure 24:
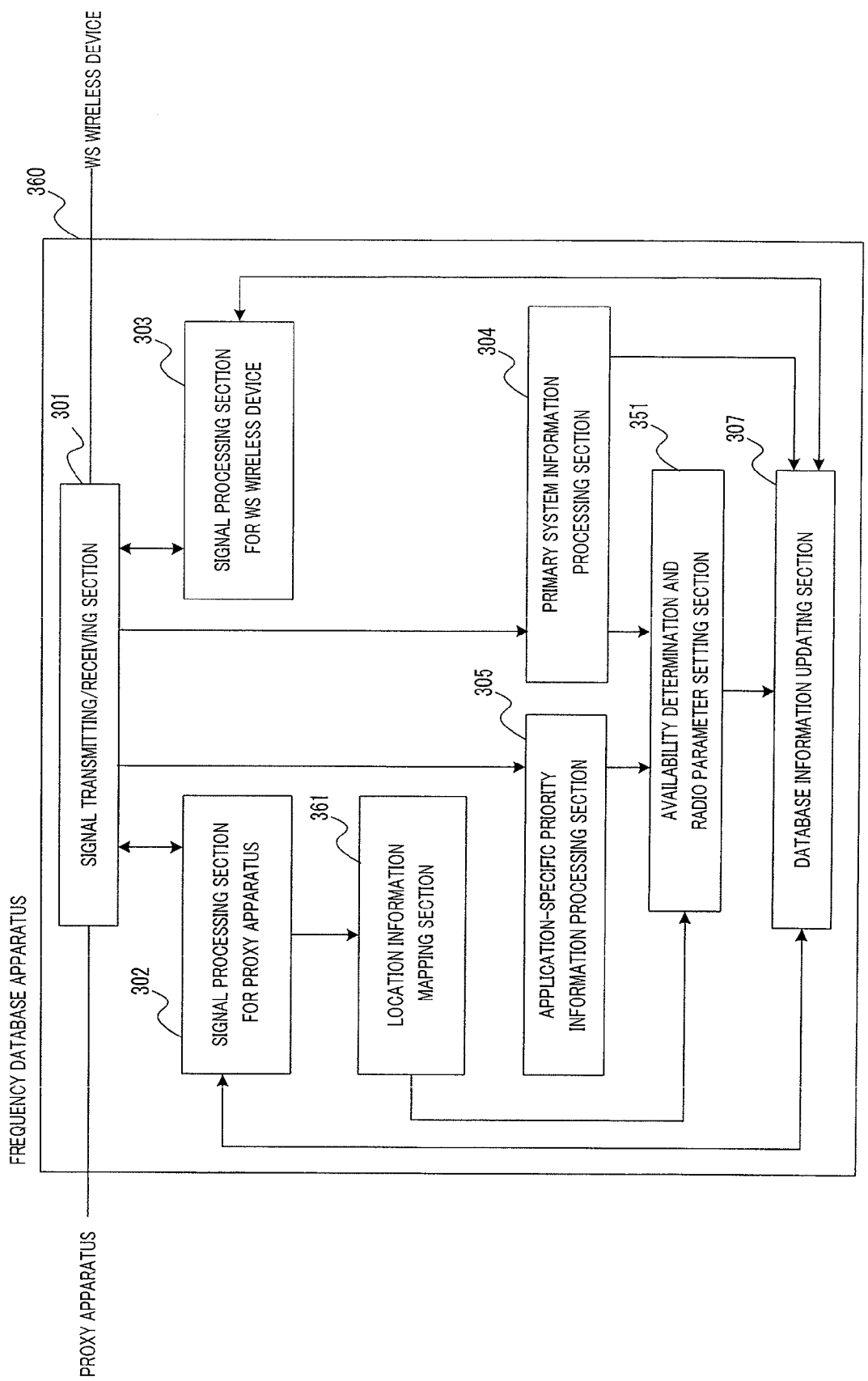
FIG. 24 is a block diagram illustrating a configuration of a frequency database apparatus illustrated in FIG. 22.

The proxy apparatus for application A illustrated in FIG. 22 has the configuration illustrated in FIG. 23. The configuration FIG. 23 is different from the configuration illustrated in FIG. 20 in that location information mapping section 221 is removed. Furthermore, the frequency database apparatus illustrated in FIG. 22 has the configuration illustrated in FIG. 24. The configuration illustrated in FIG. 24 is different from the configuration illustrated in FIG. 21 in that location information mapping section 361 is added. Location information mapping section 361 generates the area information by mapping the location information of the WS wireless device output from signal processing section for proxy apparatus 302 for each area, and outputs the generated area information to availability determination and radio parameter setting section 351.

The case in which the location information mapping section is implemented on the application-specific agent apparatus will be described with reference to FIG. 25. However, note that the description for FIG. 25 only includes difference from FIG. 16.

In ST461, the second WS wireless device obtains, from the frequency database apparatus, the information representing that the channel #2 (Ch. #2) is available as the WS channel at transmission power (power class) PC1 in each of areas #1 to 4.

In ST462, the agent apparatus for application A determines the required radio parameter such as the transmission power in order to set communication coverage necessary for the application A appropriately.

In ST463, the agent apparatus for application A sets the radio parameter for application A and for application B in each area, and determines the availability based on "arbitrated WS channel use request and area information", "application-specific priority information", "required radio parameter", and "primary system information".

In ST464, the second WS wireless device obtains, from the frequency database apparatus, the information that the areas #2 to 4 are available for application B in power class PC3, PC2, and PC1 (PC1>PC2>PC3), respectively.

Figure 25:
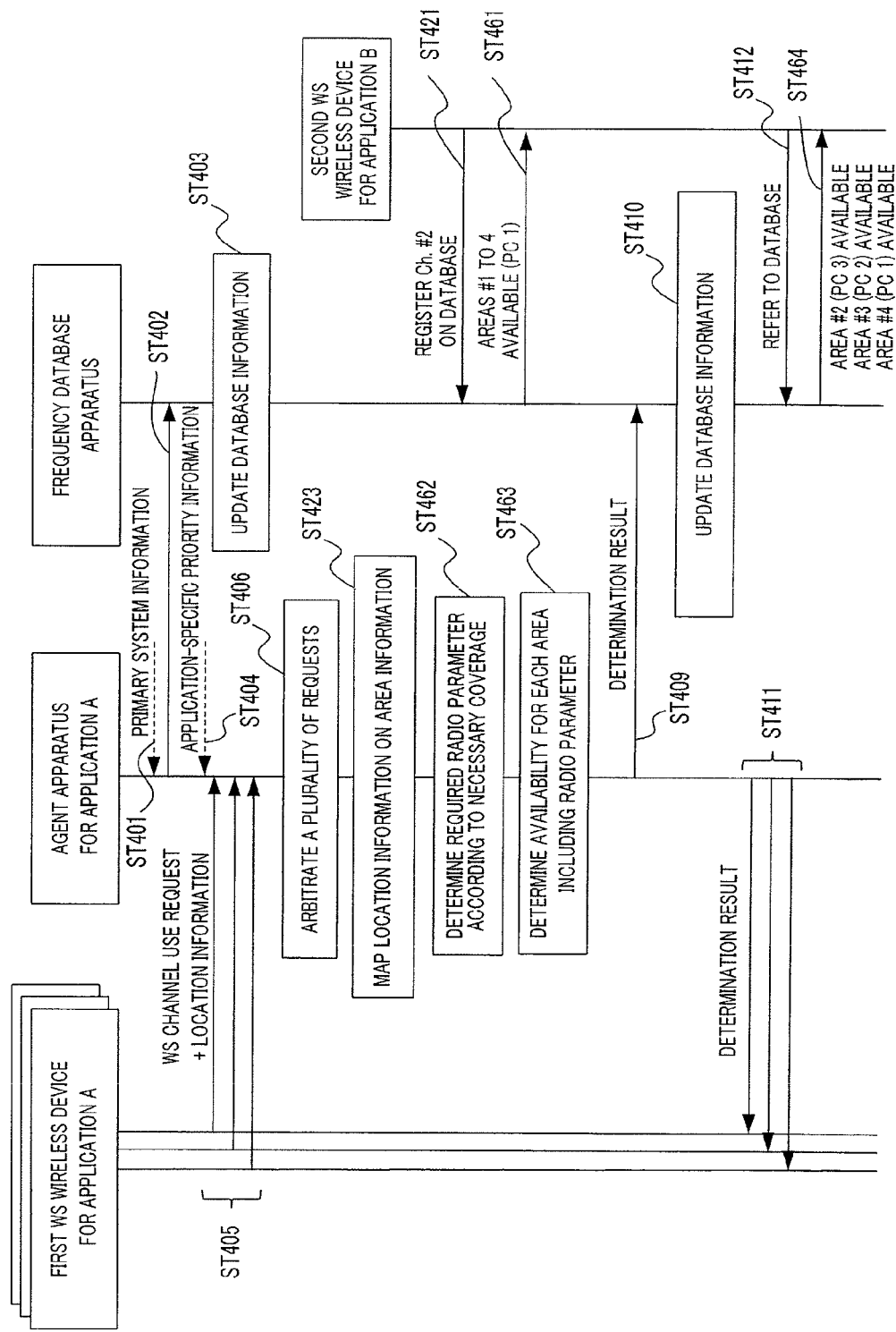
FIG. 25 is a sequence diagram for describing a WS sharing control method when a location information mapping section is implemented on an application-specific agent apparatus.
Figure 26:
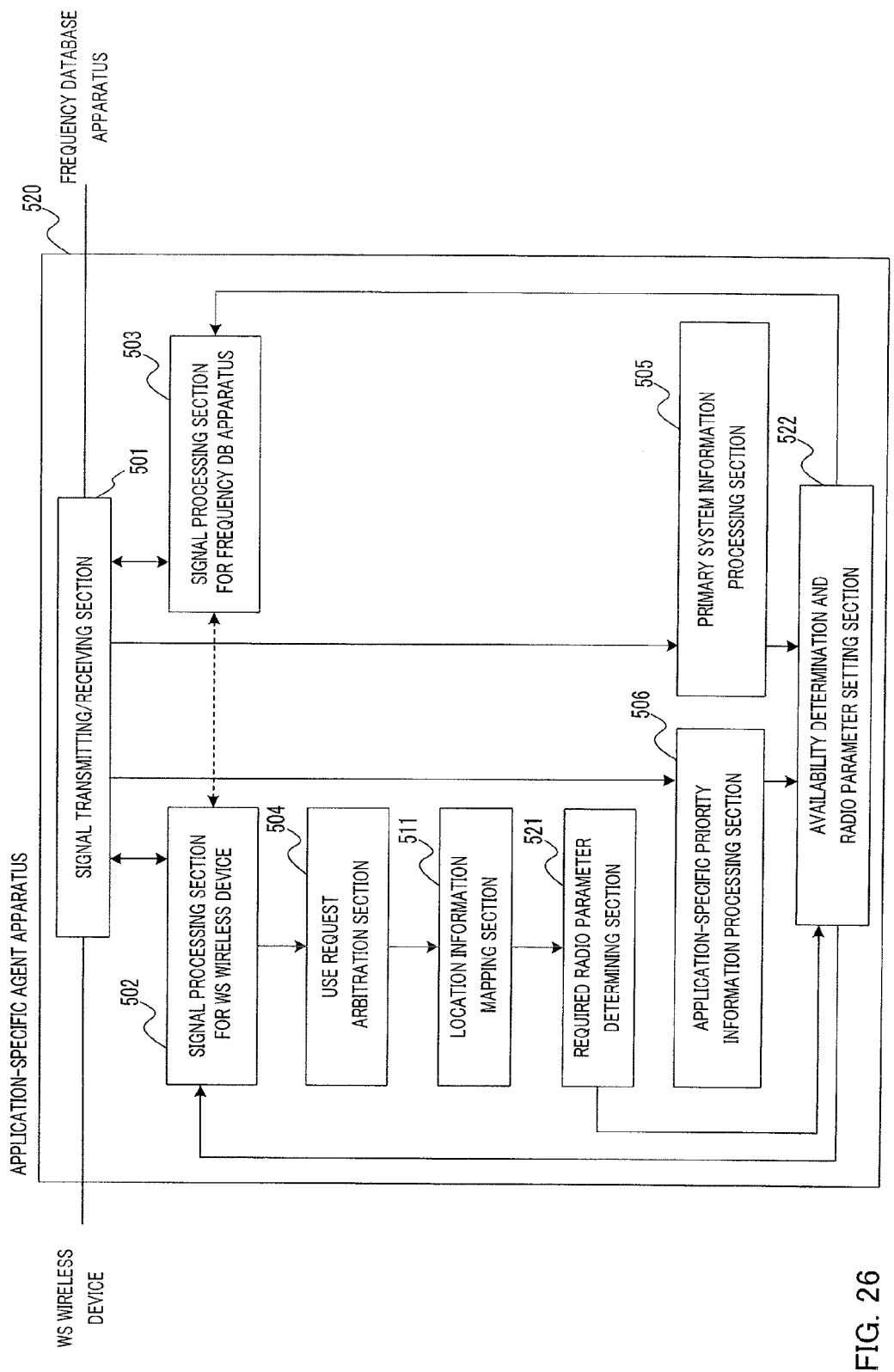
FIG. 26 is a block diagram illustrating a configuration of an application-specific agent apparatus illustrated in FIG. 25.

The frequency database apparatus illustrated in FIG. 25 has the configuration identical to the configuration according to Embodiment 2 illustrated in FIG. 9. The application-specific agent apparatus illustrated in FIG. 25 has the configuration illustrated in FIG. 26. The application-specific agent apparatus illustrated in FIG. 26 is different from the application-specific agent apparatus illustrated in FIG. 17 in that request radio parameter determining section 521 is added and availability determining section 512 is replaced with availability determination and radio parameter setting section 522. Required radio parameter determining section 521 determines, based on the area information output from location information mapping section 511, required radio parameters such as transmission power for setting necessary communication coverage appropriately, and outputs the determined required radio parameters to availability determination and radio parameter setting section 522.

Availability and radio parameter setting section 522 sets radio parameters for application A and application B and determines availability for each area, based on "the arbitrated WS channel use request, the area information and the required radio parameter" output from required radio parameter determining section 521, "primary system information" output from primary system information processing section 505, and "application-specific priority information" output from application-specific priority information processing section 506.

Note that, in Embodiment 4, the transmission/reception between the WS wireless device and a proxy apparatus for application A, between the WS wireless device and the agent apparatus for application A, between the WS wireless device and a frequency database, between the proxy apparatus for application A and the frequency database, and between the agent apparatus for application A and the frequency database apparatus may be either wireless or wired transmission. Furthermore, in the case of wireless transmission, the transmission/reception may be performed on a wireless system operated on the WS or a wireless system operated outside of the WS.

Embodiments of the present invention have been described.

Note that, in Embodiments described above, a channel may be divided on the frequency axis or on the time axis.

Furthermore, in Embodiments described above, WS wireless device refers to a WS wireless device representing a wireless system for a certain use, which is a base station or a mobile station composing the wireless system.

Functional blocks according to Embodiments described above are configured as LSI (Large Scale Integration), which is an integrated circuit. Each of the functional blocks may be individually implemented as one chip, or a plurality of the functional blocks may be integrated into one chip. Note that, the LSI referred here may be IC (integrated circuit), a system LSI, a super LSI, or an ultra LSI, depending on the degree of integration. The integrated circuit may be implemented by not only the LSI, but also by a dedicated circuit or a general-purpose processor. Alternatively, an FPGA (field programmable gate array) that can be programmed after fabrication of the LSI, or a configurable processor capable of reconfiguring connection or settings of LSI may be used. Furthermore, the functional blocks may be integrated by a technology for other integration replacing LSI, which will appear along with the progress in the semiconductor technology and another technology derived. Possible examples include application of the biotechnology, for example.

The disclosure of Japanese Patent Application No. 2011-176142, filed on Aug. 11, 2011, including the specification, drawings and abstract, is incorporated herein by reference in its entirety.

INDUSTRIAL APPLICABILITY

The white space sharing control method, the database apparatus, the agent apparatus and the communication system according to the present invention are applicable to a mobile communication system and others.

REFERENCE SIGNS LIST

200, 220, 230, 240 Application-specific proxy apparatus
201, 301, 321, 501 Signal transmitting/receiving section
202, 303, 323, 502 Signal processing section for WS wireless device
203, 503 Signal processing section for frequency database apparatus
204, 504 Use request arbitration section
300, 320, 340, 350, 360 Frequency database apparatus
302 Signal processing section for proxy apparatus
304, 505 Primary system information processing section
305, 506 Application-specific priority information processing section
306, 341, 507, 512 Availability determining section
307, 324 Database information updating section
500, 520 Application-specific agent apparatus
322 Signal processing section for agent apparatus
221, 342, 361, 511 Location information mapping section
231, 521 Required radio parameter determining section
351, 522 Availability determination and radio parameter setting section

The invention claimed is:

1. A white space sharing control method comprising:
mapping, on area information, location information of a wireless device indicating a request for using a white space;
determining, by a database apparatus or an agent apparatus, availability of the white space for each application for each area, based on the area information and a priority of applications for the white space determined in advance, when a plurality of wireless devices for different applications compete for using the white space; and
notifying, by the database apparatus or the agent apparatus, the wireless devices for the different applications of a result of the determining, wherein
the determining comprises, when a request is received, for a first application, to use a white space reserved for a second application having a lower priority than the first application, removing a reservation for the second application from the white space in a communication area for the first application to have the white space become available for the first application.

2. The white space sharing control method according to claim 1, further comprising arbitrating requests for using the white space transmitted from the plurality of wireless devices for a same application.

3. The white space sharing control method according to claim 1, wherein the determining further comprises setting a radio parameter according to a coverage necessary for the first application to be made available to the second application in an area that does not interfere with the first application, the radio parameter being set based on the area information and a required radio parameters for the first application.

4. A database apparatus comprising:
an availability determining processor that determines availability of a white space for each application for each area based on (i) a request for using the white space transmitted from a wireless device, (ii) primary system information representing a channel used by a primary system, (iii) application-specific priority information representing priority determined for each application of the white space in advance, and (iv) area information in which location information of a wireless device indicating a request for using the white space is mapped; and
a database information storage that stores a result of the determination and updates database information storing a use status of the white space for each application, wherein
when a request is received, for a first application, to use a white space reserved for a second application having a lower priority than the first application, the availability determining processor removes a reservation for the second application from the white space in a communication area for the first application to have the white space become available for the first application.

5. The database apparatus according to claim 4, further comprising a mapping processor that maps, on the area information, the location information of the wireless device indicating a request for using the white space.

6. The database apparatus according to claim 4, wherein the availability determining processor sets a radio parameter according to coverage necessary for the first application to be made available to the second application in an area that does not interfere with the first application, the radio parameter being set based on the area information and required radio parameters for the first application.

7. An agent apparatus comprising:
an availability determining processor that determines availability of a white space for each application for each area based on (i) a request for using the white space transmitted from a wireless device, (ii) primary system information representing a channel used by a primary system, (iii) application-specific priority information representing priority determined for each application of the white space in advance, and (iv) area information in which location information of a wireless device indicating a request for using the white space is mapped; and a notifying transmitter that notifies the wireless device of a result of the determination, wherein
when a request is received, for a first application, to use a white space reserved for a second application having a lower priority than the first application, the availability determining processor determines that a reservation for the second application is to be removed from the white space in a communication area for the first application to have the white space become available for the first application.

8. The agent apparatus according to claim 7, further comprising an arbitration processor that arbitrates requests for using the white space transmitted from a plurality of wireless devices for a same application.

9. The agent apparatus according to claim 7, further comprising a mapping processor that maps, on the area information, the location information of the wireless device indicating a request for using the white space.

10. The agent apparatus according to claim 7, wherein the availability determining processor sets a radio parameter according to coverage necessary for the first application to be made available to the second application in an area that does not interfere with the first application, the radio parameter being set based on the area information and required radio parameters for the first application.

* * * * *